(12) United States Patent
Zhang et al.

(10) Patent No.: US 10,172,106 B2
(45) Date of Patent: Jan. 1, 2019

(54) COMMUNICATION METHOD AND DEVICE FOR REDUCING DATA TRANSMISSION INTERRUPTION DURING HANDOVERS

(71) Applicant: Huawei Technologies Co., Ltd., Shenzhen (CN)

(72) Inventors: Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/816,665

(22) Filed: Nov. 17, 2017

(65) Prior Publication Data
US 2018/0077661 A1    Mar. 15, 2018

Related U.S. Application Data

(63) Continuation of application No. PCT/CN2015/079353, filed on May 20, 2015.

(51) Int. Cl.
*H04W 56/00* (2009.01)
*H04W 76/27* (2018.01)
(Continued)

(52) U.S. Cl.
CPC ......... *H04W 56/001* (2013.01); *H04L 5/0048* (2013.01); *H04W 36/00* (2013.01);
(Continued)

(58) Field of Classification Search
CPC ... H04W 84/045; H04W 64/00; H04W 36/14; H04W 52/325; H04W 88/06;
(Continued)

(56) References Cited

U.S. PATENT DOCUMENTS

| 8,218,500 B2 * | 7/2012 | Kangude | H04W 36/0072 |
| | | | 370/331 |
| 2008/0070578 A1 | 3/2008 | Flore et al. | |

(Continued)

FOREIGN PATENT DOCUMENTS

| CN | 102761954 A | 10/2012 |
| CN | 103139900 A | 6/2013 |

(Continued)

*Primary Examiner* — Nimesh Patel
(74) *Attorney, Agent, or Firm* — Leydig, Voit & Mayer, Ltd.

(57) ABSTRACT

A communication method and a device for reducing data transmission interruption during handovers are provided. The method includes: receiving instruction information, where the instruction information is used to instruct user equipment to establish and/or maintain uplink synchronization of the user equipment with a first cell controlled by a first base station; when the user equipment is in uplink synchronization with the first cell according to the instruction information, the user equipment is in a radio resource control RRC connected state, and a serving cell of the user equipment is a second cell controlled by a second base station; and handing over the user equipment from the second cell to the first cell that is in uplink synchronization with the user equipment, and performing communication based on the first cell.

20 Claims, 11 Drawing Sheets

(51) Int. Cl.
  *H04L 5/00* (2006.01)
  *H04W 36/00* (2009.01)
  *H04W 36/04* (2009.01)
  *H04W 74/08* (2009.01)
  *H04W 88/02* (2009.01)
  *H04W 88/08* (2009.01)

(52) U.S. Cl.
  CPC ....... *H04W 36/0016* (2013.01); *H04W 36/04* (2013.01); *H04W 56/0045* (2013.01); *H04W 74/0833* (2013.01); *H04W 76/27* (2018.02); *H04W 88/02* (2013.01); *H04W 88/08* (2013.01)

(58) Field of Classification Search
  CPC ............... H04W 48/18; H04W 52/244; H04W 36/0055; H04W 8/26; H04W 72/0453; H04W 36/0083; H04W 36/0066; H04W 56/0015; H04W 36/08; H04W 72/04; H04W 56/0045; H04W 36/0072; H04W 36/32; H04W 56/0005; H04W 72/044; H04W 72/0446; H04W 76/19; H04W 8/22; H04W 36/0016; H04W 36/02; H04W 48/20; H04W 4/70; H04W 74/006; H04W 88/02; H04W 88/08; H04W 36/30; H04W 74/0833; H04W 24/10; H04W 72/0406; H04W 36/0077; H04W 36/04; H04W 72/1284
  See application file for complete search history.

(56) References Cited

U.S. PATENT DOCUMENTS

| | | | |
|---|---|---|---|
| 2010/0232327 | A1 | 9/2010 | Kim et al. |
| 2010/0304748 | A1* | 12/2010 | Henttonen ........ H04W 36/0077 455/436 |
| 2011/0200014 | A1* | 8/2011 | Lee ................... H04W 36/0083 370/332 |
| 2011/0275374 | A1* | 11/2011 | Narasimha ............ H04L 5/0007 455/436 |
| 2012/0142354 | A1* | 6/2012 | Ahluwalia ........ H04W 36/0072 455/436 |

FOREIGN PATENT DOCUMENTS

| | | |
|---|---|---|
| CN | 103428786 A | 12/2013 |
| WO | 2007127800 A2 | 11/2007 |
| WO | 2012169840 A2 | 12/2012 |

* cited by examiner

COMMUNICATION METHOD AND DEVICE FOR REDUCING DATA TRANSMISSION INTERRUPTION DURING HANDOVERS

CROSS-REFERENCE TO RELATED APPLICATIONS

This application is a continuation of International Application No. PCT/CN2015/079353, filed on May 20, 2015, the disclosure of which is hereby incorporated by reference in its entirety.

TECHNICAL FIELD

Embodiments of the present invention relate to communications technologies, and in particular, to a communication method and a device.

BACKGROUND

With popularity of smartphones, traffic requirements of users become increasingly high. Dense deployment of small-cell base stations is an effective method for coping with the increasingly high traffic requirements and is also a development trend in the future. However, because a coverage area of a small-cell base station is quite small, after user equipment (UE for short) enters the coverage area of the small-cell base station, the UE may quickly move out of the coverage of the small-cell base station, resulting in frequent handovers of the UE and relatively poor user experience.

Currently, this problem can be resolved by using a dual connectivity (DC for short) technology. Specifically, the DC technology supports carrier aggregation (CA for short) across multiple cells of two base stations. For UE, one of the two base stations is a master eNodeB (MeNB for short), and the other is a secondary eNodeB (SeNB for short). In the DC technology, the UE needs to connect to cells of the two base stations. The master eNodeB and the secondary eNodeB can both transmit user data, and the master eNodeB needs to carry out more control functions, for example, transmission of radio resource control (RRC for short) signaling.

However, if the DC technology is used to resolve the problem of frequent handovers caused by movement of the UE, a macro base station needs to be used as a master eNodeB, and a small-cell base station needs to be used as a secondary eNodeB. In the DC technology, the UE needs to perform communication at the master eNodeB (macro base station). This hinders power saving of the UE. In addition, the UE needs to have a carrier aggregation (CA for short) capability, that is, needs to support both uplink CA and downlink CA to use DC. Therefore, for UE that does not support DC, frequent handovers of the UE occur if the UE enters and quickly moves out from a coverage area of a small-cell base station. Consequently, data transmission is interrupted for a relatively long time, causing relatively poor user experience.

SUMMARY

Embodiments of the present invention provide a communication method and a device, so as to reduce a time of data transmission interruption caused by a handover of UE between cells, and improve user experience.

According to a first aspect, an embodiment of the present invention provides a communication method, including:

receiving, by user equipment, instruction information, where the instruction information is used to instruct the user equipment to establish and/or maintain uplink synchronization of the user equipment with a first cell controlled by a first base station;

when the user equipment is in uplink synchronization with the first cell according to the instruction information, the user equipment is in a radio resource control RRC connected state, and a serving cell of the user equipment is a second cell controlled by a second base station; and handing over the user equipment from the second cell to the first cell that is in uplink synchronization with the user equipment, and performing communication based on the first cell.

With reference to the first aspect, in a first possible implementation of the first aspect, the receiving, by user equipment, instruction information includes:

receiving, by the user equipment, a first handover message sent by the first base station, where the first handover message is used to instruct to hand over the user equipment from the first cell to the second cell, and the first handover message includes the instruction information.

With reference to the first aspect, in a second possible implementation of the first aspect, the receiving, by user equipment, instruction information includes:

receiving, by the user equipment, the instruction information sent by the second base station.

With reference to any one of the first aspect to the first to the second possible implementations of the first aspect, in a third possible implementation of the first aspect, the method further includes:

sending, by the user equipment, an uplink signal to the first base station according to the instruction information, so that the first base station obtains a timing advance TA or TA offset of the user equipment according to the uplink signal; and receiving, by the user equipment, the TA or TA offset sent by the first base station or sent by the first base station by using the second base station, and establishing and/or maintaining uplink synchronization of the user equipment with the first cell according to the TA or TA offset.

With reference to the third possible implementation of the first aspect, in a fourth possible implementation of the first aspect, the uplink signal includes: a random access preamble signal, or a sounding reference signal, or a scheduling request SR signal.

With reference to any one of the first aspect to the first to the fourth possible implementations of the first aspect, in a fifth possible implementation of the first aspect, the instruction information includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the first aspect to the first to the fifth possible implementations of the first aspect, in a sixth possible implementation of the first aspect, the handing over the user equipment from the second cell to the first cell that stays in uplink synchronization with the user equipment specifically includes:

if a radio link between the user equipment and the second cell fails, or the user equipment receives a second handover message sent by the second base station, handing over the user equipment from the second cell to the first cell that stays in uplink synchronization with the user equipment, where the second handover message is used to instruct to hand over the user equipment from the second cell to the first cell.

With reference to any one of the first aspect to the first to the sixth possible implementations of the first aspect, in a seventh possible implementation of the first aspect, the method further includes:

sending, by the user equipment, an SR message to the first base station by using the first cell, where the SR message is used to request the first base station to perform data scheduling on the user equipment.

According to a second aspect, an embodiment of the present invention provides a communication method, including:

sending, by a first base station, a first handover message to user equipment, where the first handover message is used to instruct to hand over the user equipment from a first cell controlled by the first base station to a second cell controlled by a second base station, the first handover message includes the instruction information, and the instruction information is used to instruct the user equipment to establish and/or maintain uplink synchronization of the user equipment with the first cell; and when the user equipment is handed over from the second cell to the first cell that is in uplink synchronization with the user equipment, performing, by the first base station, communication with the user equipment based on the first cell.

With reference to the second aspect, in a first possible implementation of the second aspect, the method further includes:

receiving, by the first base station based on the first cell, an uplink signal that is sent by the user equipment according to the instruction information, and obtaining a timing advance TA or TA offset of the user equipment according to the uplink signal; and sending, by the first base station, the TA or TA offset to the user equipment, where the TA or TA offset is used to enable the user equipment to establish and/or maintain uplink synchronization of the user equipment with the first cell.

With reference to the first possible implementation of the second aspect, in a second possible implementation of the second aspect, the uplink signal includes: a random access preamble signal, or a sounding reference signal, or a scheduling request SR signal.

With reference to any one of the second aspect to the first to the second possible implementations of the second aspect, in a third possible implementation of the second aspect, the method further includes:

saving, by the first base station, context information of the user equipment after the user equipment is handed over from the first cell to the second cell.

With reference to any one of the second aspect to the first to the third possible implementations of the second aspect, in a fourth possible implementation of the second aspect, the instruction information includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the second aspect to the first to the fourth possible implementations of the second aspect, in a fifth possible implementation of the second aspect, before the sending, by a first base station, a first handover message to user equipment, the method further includes:

sending, by the first base station, a third handover message to the second base station, where the third handover message is used to request the second base station to allow the user equipment to establish and/or maintain uplink synchronization with the first cell after the user equipment is handed over from the first cell to the second cell; and receiving, by the first base station, a handover response message that is returned by the second base station according to the third handover message.

With reference to the fifth possible implementation of the second aspect, in a sixth possible implementation of the second aspect, the third handover message includes at least one of the following information: sounding reference signal configuration information, scheduling request SR configuration information, or uplink synchronization interval configuration information.

According to a third aspect, an embodiment of the present invention provides a communication method, including:

sending, by a second base station, instruction information to user equipment, where the instruction information is used to instruct the user equipment to establish and/or maintain uplink synchronization of the user equipment with a first cell controlled by a first base station, so that during a handover, the user equipment is handed over from a second cell controlled by the second base station to the first cell that is in uplink synchronization with the user equipment.

With reference to the third aspect, in a first possible implementation of the third aspect, the instruction information includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to the third aspect or the first possible implementation of the third aspect, in a second possible implementation of the third aspect, the method further includes:

sending, by the second base station, a handover message to the user equipment, where the handover message is used to hand over the user equipment from the second cell to the first cell that stays in uplink synchronization with the user equipment.

With reference to any one of the third aspect to the first to the second possible implementations of the third aspect, in a third possible implementation of the third aspect, before the sending, by a second base station, instruction information to user equipment, the method further includes:

sending, by the second base station, a request message to the first base station, where the request message is used to request the first cell to allow the user equipment to establish and/or maintain uplink synchronization with the first cell; and receiving, by the second base station, a response message that is sent by the first base station according to the request message.

According to a fourth aspect, an embodiment of the present invention provides user equipment, including:

a receiving unit, configured to receive instruction information, where the instruction information is used to instruct the user equipment to establish and/or maintain uplink synchronization of the user equipment with a first cell controlled by a first base station; and a processing unit, configured to perform a handover from the second cell to the first cell that is in uplink synchronization with the user equipment, and perform communication based on the first cell, where when the user equipment is in uplink synchronization with the first cell according to the instruction information, the user equipment is in a radio resource control RRC connected state, and a serving cell of the user equipment is a second cell controlled by a second base station.

With reference to the fourth aspect, in a first possible implementation of the fourth aspect, the receiving unit is specifically configured to:

receive a first handover message sent by the first base station, where the first handover message is used to instruct to hand over the user equipment from the first cell to the second cell, and the first handover message includes the instruction information.

With reference to the fourth aspect, in a second possible implementation of the fourth aspect, the receiving unit is specifically configured to:

receive the instruction information sent by the second base station.

With reference to any one of the fourth aspect to the first to the second possible implementations of the fourth aspect, in a third possible implementation of the fourth aspect, the user equipment further includes: a sending unit, where the sending unit is configured to send an uplink signal to the first base station according to the instruction information, so that the first base station obtains a timing advance TA or TA offset of the user equipment according to the uplink signal;

the receiving unit is further configured to receive the TA or TA offset sent by the first base station or sent by the first base station by using the second base station; and the processing unit is configured to establish and/or maintain uplink synchronization of the user equipment with the first cell according to the TA or TA offset.

With reference to the third possible implementation of the fourth aspect, in a fourth possible implementation of the fourth aspect, the uplink signal sent by the sending unit includes: a random access preamble signal, or a sounding reference signal, or a scheduling request SR signal.

With reference to any one of the fourth aspect to the first to the fourth possible implementations of the fourth aspect, in a fifth possible implementation of the fourth aspect, the instruction information received by the receiving unit includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the fourth aspect to the first to the fifth possible implementations of the fourth aspect, in a sixth possible implementation of the fourth aspect, the receiving unit is further configured to receive a second handover message sent by the second base station; and the processing unit is specifically configured to:

if a radio link between the user equipment and the second cell fails, or the receiving unit receives the second handover message sent by the second base station, perform a handover from the second cell to the first cell that stays in uplink synchronization with the user equipment, where the second handover message is used to instruct to hand over the user equipment from the second cell to the first cell.

With reference to any one of the fourth aspect to the first to the sixth possible implementations of the fourth aspect, in a seventh possible implementation of the fourth aspect, the sending unit is further configured to send an SR message to the first base station by using the first cell, where the SR message is used to request the first base station to perform data scheduling on the user equipment.

According to a fifth aspect, an embodiment of the present invention provides a base station, including:

a sending unit, configured to send a first handover message to user equipment, where the first handover message is used to instruct to hand over the user equipment from a first cell controlled by a first base station to a second cell controlled by a second base station, the first handover message includes the instruction information, and the instruction information is used to instruct the user equipment to establish and/or maintain uplink synchronization of the user equipment with the first cell; and a processing unit, configured to: when the user equipment is handed over from the second cell to the first cell that is in uplink synchronization with the user equipment, perform communication with the user equipment based on the first cell.

With reference to the fifth aspect, in a first possible implementation of the fifth aspect, the base station further includes: a receiving unit, where the receiving unit is configured to receive, based on the first cell, an uplink signal that is sent by the user equipment according to the instruction information, and obtain a timing advance TA or TA offset of the user equipment according to the uplink signal; and the sending unit is further configured to send the TA or TA offset to the user equipment, where the TA or TA offset is used to enable the user equipment to establish and/or maintain uplink synchronization of the user equipment with the first cell.

With reference to the first possible implementation of the fifth aspect, in a second possible implementation of the fifth aspect, the uplink signal received by the receiving unit includes: a random access preamble signal, or a sounding reference signal, or a scheduling request SR signal.

With reference to any one of the fifth aspect to the first to the second possible implementations of the fifth aspect, in a third possible implementation of the fifth aspect, the base station further includes: a saving unit, where the saving unit is configured to save context information of the user equipment after the user equipment is handed over from the first cell to the second cell.

With reference to any one of the fifth aspect to the first to the third possible implementations of the fifth aspect, in a fourth possible implementation of the fifth aspect, the instruction information sent by the sending unit includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the fifth aspect to the first to the fourth possible implementations of the fifth aspect, in a fifth possible implementation of the fifth aspect, the sending unit is further configured to send a third handover message to the second base station, where the third handover message is used to request the second base station to allow the user equipment to establish and/or maintain uplink synchronization with the first cell after the user equipment is handed over from the first cell to the second cell; and the receiving unit is further configured to receive a handover response message that is returned by the second base station according to the third handover message.

With reference to the fifth possible implementation of the fifth aspect, in a sixth possible implementation of the fifth aspect, the third handover message sent by the sending unit includes at least one of the following information: sounding reference signal configuration information, scheduling request SR configuration information, or uplink synchronization interval configuration information.

According to a sixth aspect, the present invention provides a base station, including:

a sending unit, configured to send instruction information to user equipment, where the instruction information is used to instruct the user equipment to establish and/or maintain uplink synchronization of the user equipment with a first cell controlled by a first base station, so that during a handover, the user equipment is handed over from a second cell controlled by the second base station to the first cell that is in uplink synchronization with the user equipment.

With reference to the sixth aspect, in a first possible implementation of the sixth aspect, the instruction information sent by the sending unit includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to the sixth aspect or the first possible implementation of the sixth aspect, in a second possible implementation of the sixth aspect, the sending unit is further configured to send a handover message to the user equipment, where the handover message is used to hand over the user equipment from the second cell to the first cell that stays in uplink synchronization with the user equipment.

With reference to any one of the sixth aspect to the first to the second possible implementations of the sixth aspect, in a third possible implementation of the sixth aspect, the base station further includes: a receiving unit, where the sending unit is further configured to send a request message to the first base station, where the request message is used to request the first cell to allow the user equipment to establish and/or maintain uplink synchronization with the first cell; and the receiving unit is further configured to receive a response message that is sent by the first base station according to the request message.

According to a seventh aspect, an embodiment of the present invention provides user equipment, including:

a receiver, configured to receive instruction information, where the instruction information is used to instruct the user equipment to establish and/or maintain uplink synchronization of the user equipment with a first cell controlled by a first base station; and a processor, configured to perform a handover from the second cell to the first cell that is in uplink synchronization with the user equipment, and perform communication based on the first cell, where when the user equipment is in uplink synchronization with the first cell according to the instruction information, the user equipment is in a radio resource control RRC connected state, and a serving cell of the user equipment is a second cell controlled by a second base station.

With reference to the seventh aspect, in a first possible implementation of the seventh aspect, the receiver is specifically configured to:

receive a first handover message sent by the first base station, where the first handover message is used to instruct to hand over the user equipment from the first cell to the second cell, and the first handover message includes the instruction information.

With reference to the seventh aspect, in a second possible implementation of the seventh aspect, the receiver is specifically configured to: receive the instruction information sent by the second base station.

With reference to any one of the seventh aspect to the first to the second possible implementations of the seventh aspect, in a third possible implementation of the seventh aspect, the user equipment further includes: a transmitter, where the transmitter is configured to send an uplink signal to the first base station according to the instruction information, so that the first base station obtains a timing advance TA or TA offset of the user equipment according to the uplink signal;

the receiver is further configured to receive the TA or TA offset sent by the first base station or sent by the first base station by using the second base station; and the processor is further configured to establish and/or maintain uplink synchronization of the user equipment with the first cell according to the TA or TA offset.

With reference to the third possible implementation of the seventh aspect, in a fourth possible implementation of the seventh aspect, the uplink signal sent by the transmitter includes: a random access preamble signal, or a sounding reference signal, or a scheduling request SR signal.

With reference to any one of the seventh aspect to the first to the fourth possible implementations of the seventh aspect, in a fifth possible implementation of the seventh aspect, the instruction information received by the receiver includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the seventh aspect to the first to the fifth possible implementations of the seventh aspect, in a sixth possible implementation of the seventh aspect, the receiver is further configured to receive a second handover message sent by the second base station; and the processor is further configured to: if a radio link between the user equipment and the second cell fails, or the receiver receives the second handover message sent by the second base station, perform a handover from the second cell to the first cell that stays in uplink synchronization with the user equipment, where the second handover message is used to instruct to hand over the user equipment from the second cell to the first cell.

With reference to any one of the seventh aspect to the first to the sixth possible implementations of the seventh aspect, in a seventh possible implementation of the seventh aspect, the transmitter is further configured to send an SR message to the first base station by using the first cell, where the SR message is used to request the first base station to perform data scheduling on the user equipment.

According to an eighth aspect, an embodiment of the present invention provides a base station, including:

a transmitter, configured to send a first handover message to user equipment, where the first handover message is used to instruct to hand over the user equipment from a first cell controlled by a first base station to a second cell controlled by a second base station, the first handover message includes the instruction information, and the instruction information is used to instruct the user equipment to establish and/or maintain uplink synchronization of the user equipment with the first cell; and a processor, configured to: when the user equipment is handed over from the second cell to the first cell that is in uplink synchronization with the user equipment, perform communication with the user equipment based on the first cell.

With reference to the eighth aspect, in a first possible implementation of the eighth aspect, the base station further includes: a receiver, where the receiver is configured to receive, based on the first cell, an uplink signal that is sent by the user equipment according to the instruction information, and obtain a timing advance TA or TA offset of the user equipment according to the uplink signal; and the transmitter is further configured to send the TA or TA offset to the user equipment, where the TA or TA offset is used to enable the user equipment to establish and/or maintain uplink synchronization of the user equipment with the first cell.

With reference to the first possible implementation of the eighth aspect, in a second possible implementation of the eighth aspect, the uplink signal received by the receiver includes: a random access preamble signal, or a sounding reference signal, or a scheduling request SR signal.

With reference to any one of the eighth aspect to the first to the second possible implementations of the eighth aspect, in a third possible implementation of the eighth aspect, the base station further includes: a memory, where the memory is configured to save context information of the user equipment after the user equipment is handed over from the first cell to the second cell.

With reference to any one of the eighth aspect to the first to the third possible implementations of the eighth aspect, in a fourth possible implementation of the eighth aspect, the instruction information sent by the transmitter includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to any one of the eighth aspect to the first to the fourth possible implementations of the eighth aspect, in a fifth possible implementation of the eighth aspect, the transmitter is further configured to send a third handover message to the second base station, where the third handover message is used to request the second base station to allow the user equipment to establish and/or maintain uplink synchronization with the first cell after the user equipment is handed over from the first cell to the second cell; and the receiver is further configured to receive a handover response message that is returned by the second base station according to the third handover message.

With reference to the fifth possible implementation of the eighth aspect, in a sixth possible implementation of the eighth aspect, the third handover message sent by the transmitter includes at least one of the following information: sounding reference signal configuration information, scheduling request SR configuration information, or uplink synchronization interval configuration information.

According to a ninth aspect, an embodiment of the present invention provides a base station, including:

a transmitter, configured to send instruction information to user equipment, where the instruction information is used to instruct the user equipment to establish and/or maintain uplink synchronization of the user equipment with a first cell controlled by a first base station, so that during a handover, the user equipment is handed over from a second cell controlled by the second base station to the first cell that is in uplink synchronization with the user equipment.

With reference to the ninth aspect, in a first possible implementation of the ninth aspect, the instruction information sent by the transmitter includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

With reference to the ninth aspect or the first possible implementation of the ninth aspect, in a second possible implementation of the ninth aspect, the transmitter is further configured to send a handover message to the user equipment, where the handover message is used to hand over the user equipment from the second cell to the first cell that stays in uplink synchronization with the user equipment.

With reference to any one of the ninth aspect to the first to the second possible implementations of the ninth aspect, in a third possible implementation of the ninth aspect, the base station further includes: a receiver, where the transmitter is further configured to send a request message to the first base station, where the request message is used to request the first cell to allow the user equipment to establish and/or maintain uplink synchronization with the first cell; and the receiver is further configured to receive a response message that is sent by the first base station according to the request message.

For the communication method and the device provided in the present invention, instruction information is received; when UE is in uplink synchronization with a first cell according to the instruction information, the UE is in a radio resource control RRC connected state, and a serving cell of the UE is a second cell controlled by a second base station; and the UE is handed over from the second cell to the first cell that is in uplink synchronization with the UE, and performs communication based on the first cell. Because when performing data transmission based on the second cell, the UE establishes and/or maintains uplink synchronization with the first cell, when the UE needs to perform communication based on the first cell, the UE can be quickly handed over to the first cell without needing to perform a random access process, so that a time of data transmission interruption caused by a handover of UE between cells is reduced, and user experience is improved.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

The method provided in the embodiments of the present invention may be applied to radio networks of different standards, for example, Global System for Mobile Communications (GSM for short), Code Division Multiple Access (CDMA for short), CDMA 2000, Wideband Code Division Multiple Access (WCDMA for short), Time Division-Synchronous Code Division Multiple Access (TD-SCDMA for short), a Long Term Evolution (LTE) system, or a subsequent evolved system of LTE. A radio access network may include different network elements in different systems. For example, network elements of a radio access network in LTE and a subsequent evolved system of LTE include UE and a base station NodeB, which are not limited in the embodiments of the present invention.

Figure 1:
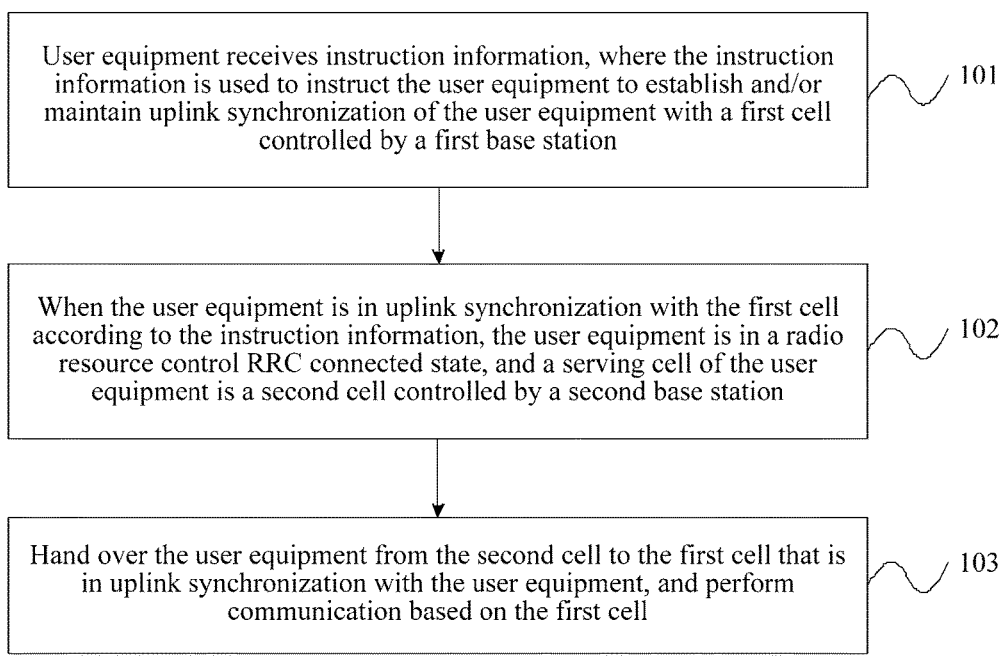
FIG. 1 is a schematic flowchart of Embodiment 1 of a communication method according to the present invention.

FIG. 1 is a schematic flowchart of Embodiment 1 of a communication method according to the present invention. This embodiment of the present invention provides a communication method. The method may be performed by any apparatus for performing the communication method, and the apparatus may be implemented by using software and/or hardware. In this embodiment, the apparatus may be integrated into UE. As shown in FIG. 1, the method in this embodiment may include the following steps.

Step 101. The user equipment receives instruction information, where the instruction information is used to instruct the user equipment to establish and/or maintain uplink synchronization of the user equipment with a first cell controlled by a first base station.

In this embodiment, the instruction information may be used to only instruct the UE to establish uplink synchronization of the UE with the first cell controlled by the first base station, or be used to only instruct the UE to maintain uplink synchronization of the UE with the first cell controlled by the first base station, or may be used to instruct the UE to establish and maintain uplink synchronization of the UE with the first cell controlled by the first base station. The first base station may be, for example, a macro base station.

Step 102. When the user equipment is in uplink synchronization with the first cell according to the instruction information, the user equipment is in a radio resource control RRC connected state, and a serving cell of the user equipment is a second cell controlled by a second base station.

In this embodiment, after receiving the instruction information, the UE establishes and/or maintains uplink synchronization of the UE with the first cell according to the instruction information. It should be noted that, in this step, when the UE is in uplink synchronization with the first cell, the UE is in an RRC connected state. The first cell is not a serving cell of the UE, and the serving cell of the UE is the second cell controlled by the second base station. The second base station may be, for example, a small-cell base station.

Step 103. Hand over the user equipment from the second cell to the first cell that is in uplink synchronization with the user equipment, and perform communication based on the first cell.

In this embodiment, after the UE establishes and/or maintains uplink synchronization of the UE with the first cell, if the UE needs to be handed over from the second cell to the first cell, the UE can be directly handed over to the first cell according to uplink synchronization of the UE with the first cell without needing to initiate a random access process to the first cell, and data and signaling transmission is performed based on the first cell.

It should be noted that, the first base station and the second base station may be a same base station, or may be different base stations. When the first base station and the second base station are a same base station, the UE is handed over between different cells of the same base station.

According to the communication method provided in this embodiment of the present invention, instruction information is received; when UE is in uplink synchronization with a first cell according to the instruction information, the UE is in a radio resource control RRC connected state, and a serving cell of the UE is a second cell controlled by a second base station; the UE is handed over from the second cell to the first cell that is in uplink synchronization with the UE, and performs communication based on the first cell. Because when performing data transmission based on the second cell, the UE establishes and/or maintains uplink synchronization with the first cell, when the UE needs to perform communication based on the first cell, the UE can be quickly handed over to the first cell without needing to perform a random access process, so that a time of data transmission interruption caused by a handover of UE between cells is reduced, and user experience is improved.

Figure 2:
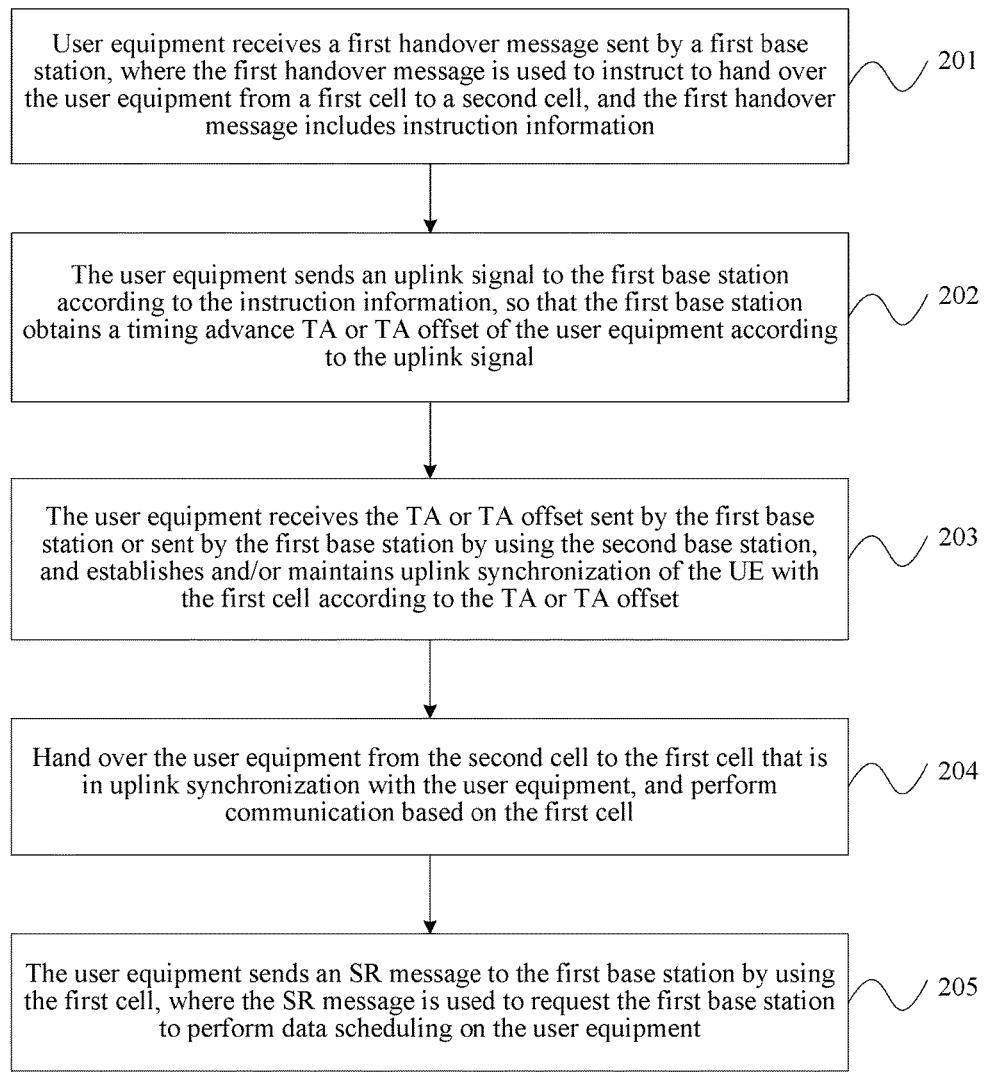
FIG. 2 is a schematic flowchart of Embodiment 2 of a communication method according to the present invention.

FIG. 2 is a schematic flowchart of Embodiment 2 of a communication method according to the present invention. Based on the embodiment shown in FIG. 1, an embodiment in which the UE establishes an initial connection with the first cell controlled by the first base station is described in detail in this embodiment. As shown in FIG. 2, the method in this embodiment may include the following steps.

Step 201. The user equipment receives a first handover message sent by the first base station, where the first handover message is used to instruct to hand over the user equipment from the first cell to the second cell, and the first handover message includes the instruction information.

In this embodiment, the UE establishes an initial connection with the first cell controlled by the first base station. In this step, when the first cell is a current serving cell of the UE, because the first base station is a macro base station with a relatively large coverage area, power consumption is relatively large when the UE performs data communication at the first base station. Therefore, a measurement task is configured for the UE, to find a second cell that meets a measurement trigger condition. The second cell that meets the measurement trigger condition is a cell of a small-cell base station with relatively high signal quality. In a specific implementation process, the UE may measure a reference signal received power (RSRP for short) value of each cell, and determine whether the value is greater than a preset threshold. If the value is greater than the preset threshold, it indicates that a cell corresponding to the RSRP value meets the measurement trigger condition. The preset threshold may be set according to an actual situation. A specific value of the preset threshold is not particularly limited in the present invention. After the UE finds the second cell that meets the measurement trigger condition, the UE sends a measurement report to the first base station, and the first base station determines, according to the measurement report sent by the UE, to hand over the UE to the second base station to perform communication. In this case, the first base station sends a third handover message to the second base station. The third handover message carries request information, and the request information is used to request the second base station to allow the UE to establish and/or maintain uplink synchronization with the first cell after the UE is handed over from the first cell to the second cell. The second base station returns a handover response message to the first base station according to the received third handover message that carries the request information. In this case, the first base station sends a first handover message to the UE according to the handover response message. The first handover message includes the instruction information, and the instruction information is used to instruct to hand over the UE from the first cell controlled by the first base station to the second cell controlled by the second base station. Because the second base station is a small-cell base station with a relatively small coverage area, when the UE performs data transmission at the second base station, a power saving purpose can be achieved. In addition, compared with a handover process in the conventional art, after sending the first handover message to the UE, the first base station still keeps context information of the UE, so that after the UE returns to the first base station subsequently, the first base station can perform communication with the UE based on the context information. Similarly, after receiving the first handover message, the UE also keeps the current context information of the UE, so that after returning to the first base station subsequently, the UE can perform communication with the first base station based on the context information.

In the conventional art, if the UE is handed over from the first cell controlled by the first base station to the second cell controlled by the second base station, sending of data from a serving gateway to the first base station is changed to sending from the serving gateway to the second base station. Optionally, because the second base station is a small-cell base station with a relatively small coverage area, the UE may quickly return to the first base station, causing frequent switching of a data path. As a result, signaling overheads and complexity are increased. Therefore, in the present invention, in a handover process in which the UE is handed over from the first cell controlled by the first base station to the second cell controlled by the second base station, data is still sent from the serving gateway to the first base station, and the first base station receives the data and sends the data to the second base station. In this way, when returning to the first base station, the UE also does not need to perform corresponding switching of a data path from the serving gateway to a base station, to avoid frequent switching of a data path, and reduce corresponding signaling overheads and complexity.

Step 202. The user equipment sends an uplink signal to the first base station according to the instruction information, so that the first base station obtains a timing advance TA or TA offset of the user equipment according to the uplink signal.

In this embodiment, after the UE performs step 201, in this step, the second cell is a serving cell of the UE, and the first cell is no longer a serving cell of the UE. The uplink signal includes a random access preamble signal, or a sounding reference signal, or a scheduling request (SR for short) signal. To establish and/or maintain uplink synchronization with the first cell according to the obtained instruction information, the UE needs to send the uplink signal periodically or aperiodically to the first base station, that is, send the uplink signal on the first cell. Therefore, the instruction information may include one or more of the following information: sounding reference signal configuration information, random access preamble information, SR configuration information, uplink synchronization interval configuration information, or a cell radio network temporary identifier (C-RNTI for short) that is of the UE in the first cell and that is allocated by the first base station. The sounding reference signal configuration information is used to enable the UE to learn resources on which the UE sends a sounding reference signal to the first cell to establish and/or maintain uplink synchronization. The random access preamble information is used to enable the UE to learn which random access preamble resource the UE needs to use when a random access channel (RACH for short) is initiated, that is, the first base station allocates and keeps a dedicated random access preamble resource for the UE. The C-RNTI that is of the UE in the first cell and that is allocated by the first base station is used to enable the UE to access the first cell. In addition, to hand over the UE to the first cell at any time to perform data transmission, the instruction information may further include the SR configuration information. The SR configuration information is used to instruct, after the UE is handed over from the second cell to the first cell, the UE to use an SR resource indicated by the SR configuration information to send an SR to the first cell to request data scheduling. In addition, the SR configuration information is further used to notify the first cell that the UE is handed over from the second cell to the first cell. Further, the UE may not support uplink CA. Therefore, when the UE performs data transmission at the second base station, to stay in uplink synchronization with the first base station, an uplink synchronization interval is needed. The uplink synchronization interval is used to instruct to hand over the UE to the first cell during the uplink synchronization interval, to send the uplink signal. Therefore, the instruction information may further include: uplink synchronization interval configuration information.

It should be noted that, the uplink synchronization interval configuration information in the instruction information may be determined by the first base station, and carried in the third handover message and sent to the second base station, to notify the second base station when the UE can receive downlink data of the second cell and when the UE cannot receive the downlink data sent by the second cell. The uplink synchronization interval configuration information may alternatively be determined by the second base station, and carried in the handover response message and sent to the first base station. It should be noted that, the uplink synchronization interval configuration information may alternatively not be included in the instruction information. Instead, the UE is handed over to the first cell in a time period of a resource indicated by the sounding reference signal configuration information, to send a sounding reference signal, and the second base station does not schedule downlink data of the UE in the time period of the resource. In this case, to notify the second base station when the UE can receive the downlink data of the second cell and when the UE cannot receive the downlink data sent by the second cell, the first base station may add the sounding reference signal configuration information to the third handover message and send the third handover message to the second base station.

If the UE does not support uplink CA, the UE sends the uplink signal during the uplink synchronization interval or in the time period of the resource indicated by the sounding reference signal configuration information, and the second base station does not schedule the UE when the UE sends the uplink signal.

After the UE sends the uplink signal to the first base station according to the instruction information, the first base station obtains a timing advance (TA for short) or a TA offset of the UE according to the received uplink signal.

Step 203. The user equipment receives the TA or TA offset sent by the first base station or sent by the first base station by using the second base station, and establishes and/or maintains uplink synchronization of the UE with the first cell according to the TA or TA offset.

In this embodiment, after obtaining the TA or TA offset of the UE, the first base station may directly send the TA or TA offset to the UE by using the first cell, or may first send the TA or TA offset to the second base station, and the second base station then forwards the TA or TA offset to the UE. A specific sending manner of the TA or TA offset is not particularly limited in the present invention.

Step 204. Hand over the user equipment from the second cell to the first cell that is in uplink synchronization with the user equipment, and perform communication based on the first cell.

In this embodiment, if a radio link between the UE and the second cell fails, or after the UE receives the second handover message that is sent by the second base station and that is used to instruct to hand over the UE from the second cell controlled by the second base station to the first cell controlled by the first base station, the UE needs to return to the first cell to perform data transmission. In this case, the UE can be quickly handed over, according to uplink synchronization of the UE with the first cell, from the second cell controlled by the second base station to the first cell controlled by the first base station without needing to initiate a random access process to the first cell.

Step 205. The user equipment sends an SR message to the first base station by using the first cell, where the SR message is used to request the first base station to perform data scheduling on the user equipment.

In this embodiment, after the UE is handed over from the second cell to the first cell, the UE sends the SR message to the first base station based on the first cell, to request the first base station to perform data scheduling on the UE, or notify the first base station that the UE has returned to the first cell to perform data transmission.

According to the communication method provided in this embodiment of the present invention, instruction information is received; when UE is in uplink synchronization with a first cell according to the instruction information, the UE is in a radio resource control RRC connected state, and a serving cell of the UE is a second cell controlled by a second base station; and the UE is handed over from the second cell to the first cell that is in uplink synchronization with the UE, and performs communication based on the first cell. Because when performing data transmission based on the second cell, the UE establishes and/or maintains uplink synchronization with the first cell, when the UE needs to perform communication based on the first cell, the UE can be quickly handed over to the first cell without needing to perform a random access process, so that a time of data transmission interruption caused by a handover of UE between cells is reduced, and user experience is improved. In addition, because after finding the second cell that meets a trigger condition, the UE is handed over from the first cell to the second cell to perform data communication, power consumption of the UE is reduced, and interference to other UEs is reduced. When a radio link between the UE and the second cell fails, or after the UE receives a second handover message that is sent by the second base station and that is used to instruct to hand over the UE from the second cell controlled by the second base station to the first cell controlled by a first base station, the UE can be handed over, without needing to initiate a random access process, to the first cell to perform communication, so as to reduce a data interruption time, and improve user experience.

Figure 3:
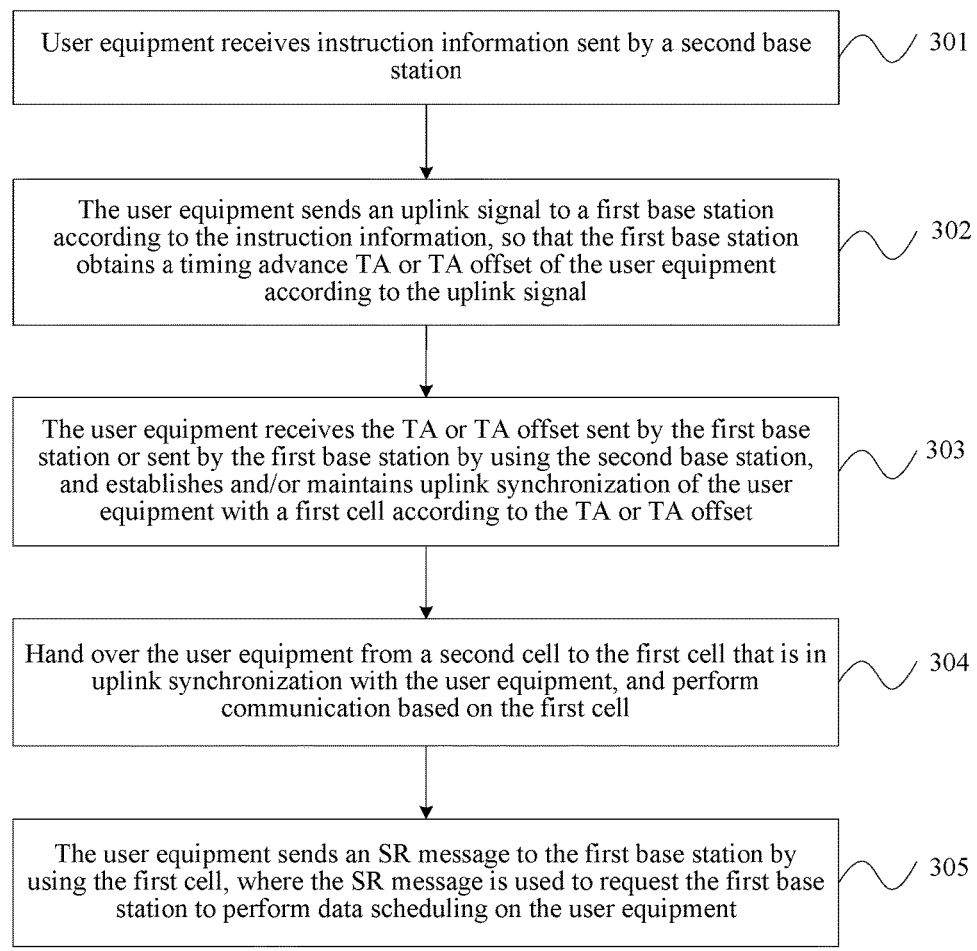
FIG. 3 is a schematic flowchart of Embodiment 3 of a communication method according to the present invention.

FIG. 3 is a schematic flowchart of Embodiment 3 of a communication method according to the present invention. Based on the embodiment shown in FIG. 1, an embodiment in which the UE establishes an initial connection with the second cell controlled by the second base station is described in detail in this embodiment. As shown in FIG. 3, the method in this embodiment may include the following steps.

Step 301: The user equipment receives the instruction information sent by the second base station.

In this embodiment, the UE establishes an initial connection with the second cell controlled by the second base station, that is, the second cell is a current serving cell of the UE, and the first cell controlled by the first base station is not the serving cell of the UE. Because the second base station has a relatively small coverage area, after entering a coverage area of a small-cell base station, the UE may quickly move out of the coverage area of the small-cell base station. In this case, the UE is frequently handed over between cells, a data interruption time is increased, and a handover failure probability is increased. To resolve the problem, in this embodiment, after the UE establishes the initial connection with the second cell controlled by the second base station, the second base station sends a request message to the first base station, to request the first base station to allow the UE to establish and/or maintain uplink synchronization with the first cell controlled by the first base station. The request message may be, for example, an uplink synchronization request message. Optionally, the request message carries context information of the UE, so that after being handed over to the first base station subsequently, the UE can perform communication with the first base station based on the context information.

The first base station returns a response message to the second base station according to the received request message. The request message carries a C-RNTI that is in the first cell and that is allocated by the first base station to the UE. After receiving the response message, the second base station sends the instruction information to the UE.

Step 302. The user equipment sends an uplink signal to the first base station according to the instruction information, so that the first base station obtains a timing advance TA or TA offset of the user equipment according to the uplink signal.

Step 303. The user equipment receives the TA or TA offset sent by the first base station or sent by the first base station by using the second base station, and establishes and/or maintains uplink synchronization of the user equipment with the first cell according to the TA or TA offset.

Step 304. Hand over the user equipment from the second cell to the first cell that is in uplink synchronization with the user equipment, and perform communication based on the first cell.

Step 305. The user equipment sends an SR message to the first base station by using the first cell, where the SR message is used to request the first base station to perform data scheduling on the user equipment.

Step 302 to step 305 are similar to step 202 to step 205, and details are not described herein again.

According to the communication method provided in this embodiment of the present invention, instruction information is received; when UE is in uplink synchronization with a first cell according to the instruction information, the UE is in a radio resource control RRC connected state, and a serving cell of the UE is a second cell controlled by a second base station; the UE is handed over from the second cell to the first cell that is in uplink synchronization with the UE, and performs communication based on the first cell. Because when performing data transmission based on the second cell, the UE establishes and/or maintains uplink synchronization with the first cell, when the UE needs to perform communication based on the first cell, the UE can be quickly handed over to the first cell without needing to perform a random access process, so that a time of data transmission interruption caused by a handover of UE between cells is reduced, and user experience is improved. In addition, when a radio link between the UE and the second cell fails, or after the UE receives a second handover message that is sent by the second base station and that is used to instruct to hand over the UE from the second cell controlled by the second base station to the first cell controlled by a first base station, the UE can be handed over, without needing to initiate a random access process, to the first cell to perform communication, so as to reduce a data interruption time, and improve user experience.

Figure 4:
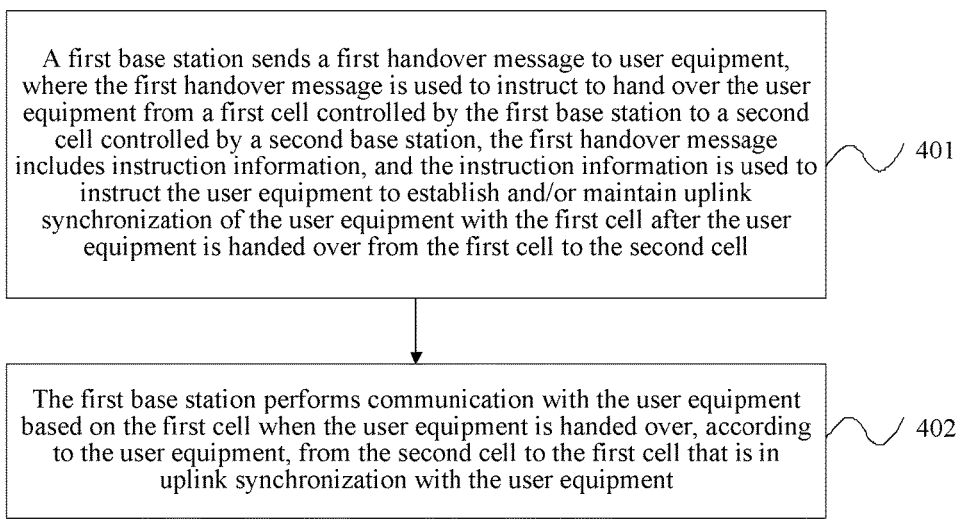
FIG. 4 is a schematic flowchart of Embodiment 4 of a communication method according to the present invention.

FIG. 4 is a schematic flowchart of Embodiment 4 of a communication method according to the present invention. This embodiment of the present invention provides a communication method. The method may be performed by any apparatus for performing the communication method, and the apparatus may be implemented by using software and/or hardware. In this embodiment, the apparatus may be integrated into a base station. As shown in FIG. 4, the method in this embodiment may include the following steps.

Step 401. A first base station sends a first handover message to user equipment, where the first handover message is used to instruct to hand over the user equipment from a first cell controlled by the first base station to a second cell controlled by a second base station, the first handover message includes instruction information, and the instruction information is used to instruct the user equipment to establish and/or maintain uplink synchronization of the user equipment with the first cell.

In this embodiment, if the UE establishes an initial connection with the first cell controlled by the first base station, that is, when the first cell is a current serving cell of the UE, because the first base station is a macro base station with a relatively large coverage area, power consumption is relatively large when the UE performs data communication at the first base station. Therefore, a measurement task is configured for the UE, to find a second cell that meets a measurement trigger condition. The second cell that meets the measurement trigger condition is a second cell controlled by a small-cell base station with relatively high signal quality. In a specific implementation process, the UE may measure an RSRP value of each cell, and determine whether the value is greater than a preset threshold. If the value is greater than the preset threshold, it indicates that a cell corresponding to the RSRP value meets the measurement trigger condition. The preset threshold may be set according to an actual situation. A specific value of the preset threshold is not particularly limited in the present invention. After the UE finds the second cell that meets the measurement trigger condition, the UE sends a measurement report to the first base station, and the first base station determines, according to the measurement report sent by the UE, to hand over the UE to the second base station to perform communication. In this case, the first base station sends, to the UE, the first handover message that carries the instruction information, so that the UE is handed over from the first cell controlled by the first base station to the second cell controlled by the second base station, including initiating a random access process or the like. The instruction information is used to instruct the UE to establish and/or maintain uplink synchronization with the first cell after the UE is handed over from the first cell to the second cell. It should be noted that, when the UE is in uplink synchronization with the first cell according to the instruction information, the UE is in an RRC connected state, and in this case, a serving cell of the UE is a second cell controlled by the second base station. Because the second base station is a small-cell base station with a relatively small coverage area, when the UE performs data transmission at the second base station, a power saving purpose can be achieved. In addition, compared with a handover process in the conventional art, after sending the first handover message of the instruction information to the UE, the first base station still keeps context information of the UE, so that after the UE returns to the first base station subsequently, the first base station can perform communication with the UE based on the context information. Similarly, after receiving the first handover message of the instruction information, the UE also keeps the current context information of the UE, so that after returning to the first base station subsequently, the UE can perform communication with the first base station based on the context information.

In the conventional art, if the UE is handed over from the first cell controlled by the first base station to the second cell controlled by the second base station, sending of data from a serving gateway to the first base station is changed to sending from the serving gateway to the second base station. Optionally, because the second base station is a small-cell base station with a small coverage area, the UE may quickly return to the first base station, and a data path is frequently switched. As a result, signaling overheads and complexity are increased. Therefore, in the present invention, in a handover process in which the UE is handed over from the first cell controlled by the first base station to the second cell controlled by the second base station, data is still sent from the serving gateway to the first base station, and the first base station receives the data and sends the data to the second base station. In this way, when returning to the first base station, the UE also does not need to perform corresponding switching of a data path from the serving gateway to a base station, to avoid frequent switching of a data path, and reduce corresponding signaling overheads and complexity.

Step 402. The first base station performs communication with the user equipment based on the first cell when the user equipment is handed over, according to the user equipment, from the second cell to the first cell that is in uplink synchronization with the user equipment.

In this embodiment, after the UE is handed over from the second cell to the first cell, the UE sends an SR message to the first base station on the first cell, to request the first base station to perform data scheduling on the UE, thereby performing data communication.

According to the communication method provided in this embodiment of the present invention, a first handover message is sent to UE, so that the UE is handed over from a first cell controlled by a first base station to a second cell controlled by a second base station; and communication is performed with the UE based on the first cell when the UE is handed over from the second cell to the first cell that is in uplink synchronization with the user equipment. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved.

Figure 5:
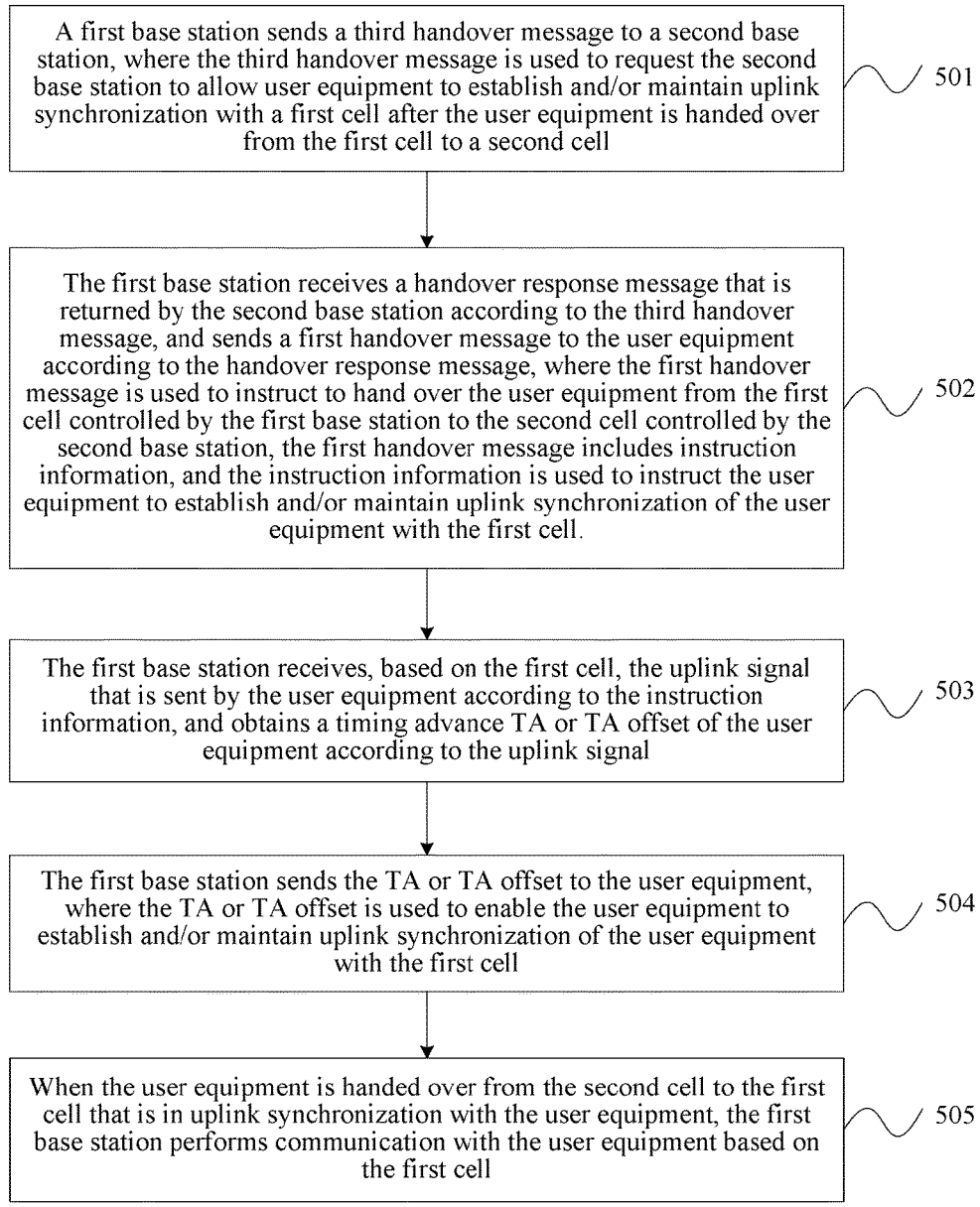
FIG. 5 is a schematic flowchart of Embodiment 5 of a communication method according to the present invention.

FIG. 5 is a schematic flowchart of Embodiment 5 of a communication method according to the present invention. Based on the embodiment shown in FIG. 4, an embodiment in which the UE establishes and/or maintains uplink synchronization with the first base station is described in detail in this embodiment. As shown in FIG. 5, the method in this embodiment may include the following steps.

Step 501. The first base station sends a third handover message to the second base station, where the third handover message is used to request the second base station to allow the user equipment to establish and/or maintain uplink synchronization with the first cell after the user equipment is handed over from the first cell to the second cell.

In this embodiment, after the UE finds the second cell that meets the measurement trigger condition, and sends a measurement report to the first base station, the first base station determines, according to the measurement report sent by the UE, to hand over the UE to the second base station to perform communication. In this case, the first base station sends a third handover message to the second base station. The third handover message carries request information, and the request information is used to request the second base station to allow the UE to establish and/or maintain uplink synchronization with the first cell after the UE is handed over from the first cell to the second cell. The third handover message includes one or more of the following information: sounding reference signal configuration information, scheduling request SR configuration information, or uplink synchronization interval configuration information. The sounding reference signal configuration information is used to enable the UE to learn resources on which the UE sends a sounding reference signal to the first cell to establish and/or maintain uplink synchronization. The SR configuration information is used to instruct, after the UE is handed over from the second cell to the first cell, the UE to use an SR resource indicated by the SR configuration information to send an SR to the first cell to request data scheduling. In addition, the SR configuration information is further used to notify the first cell that the UE is handed over from the second cell to the first cell. Further, the UE may not support uplink CA. Therefore, when the UE performs data transmission at the second base station, to stay in uplink synchronization with the first base station, an uplink synchronization interval is needed. The uplink synchronization interval is used to instruct to hand over the UE to the first cell during the interval, to send the uplink signal. Therefore, the instruction information may further include: uplink synchronization interval configuration information.

It should be noted that, the uplink synchronization interval configuration information in the instruction information may be determined by the first base station, and carried in the third handover message and sent to the second base station, to notify the second base station when the UE can receive downlink data of the second cell and when the UE cannot receive the downlink data sent by the second cell. The uplink synchronization interval configuration information may alternatively be determined by the second base station, and carried in the handover response message and sent to the first base station. It should be noted that, the uplink synchronization interval configuration information may alternatively not be included in the instruction information. Instead, the UE is handed over to the first cell in a time period of a resource indicated by the sounding reference signal configuration information, to send a sounding reference signal, and the second base station does not schedule downlink data of the UE in the time period of the resource. In this case, to notify the second base station when the UE can receive the downlink data of the second cell and when the UE cannot receive the downlink data sent by the second cell, the first base station may add the sounding reference signal configuration information to the third handover message and send the third handover message to the second base station.

Step 502. The first base station receives a handover response message that is returned by the second base station according to the third handover message, and sends a first handover message to the user equipment according to the handover response message, where the first handover message is used to instruct to hand over the user equipment from the first cell controlled by the first base station to the second cell controlled by the second base station, the first handover message includes instruction information, and the instruction information is used to instruct the user equipment to establish and/or maintain uplink synchronization of the user equipment with the first cell.

Step 502 is similar to step 401, and details are not described herein again.

Step 503. The first base station receives, based on the first cell, the uplink signal that is sent by the user equipment according to the instruction information, and obtains a timing advance TA or TA offset of the user equipment according to the uplink signal.

In this embodiment, the uplink signal includes a random access preamble signal, or a sounding reference signal, or an SR signal. To establish and/or maintain uplink synchronization with the first cell according to the received instruction information, the UE needs to send the uplink signal periodically or aperiodically to the first base station. Therefore, the instruction may include one or more of the following information: sounding reference signal configuration information, random access preamble information, SR configuration information, uplink synchronization interval configuration information, or a C-RNTI that is of the UE in the first cell and that is allocated by the first base station. The sounding reference signal configuration information is used to enable the UE to learn resources on which the UE sends a sounding reference signal to the first cell to establish and/or maintain uplink synchronization. The random access preamble information is used to enable the UE to learn which random access preamble resource the UE needs to use when an RACH is initiated, that is, the first base station allocates and keeps a dedicated random access preamble resource for the UE. The C-RNTI that is of the UE in the first cell and that is allocated by the first base station is used to enable the UE to access the first cell. In addition, to hand over the UE to the first cell at any time to perform data transmission, the instruction information may further include the SR configuration information. The SR configuration information is used to instruct, after the UE is handed over from the second cell to the first cell, the UE to use an SR resource indicated by the SR configuration information to send an SR to the first cell to request data scheduling. In addition, the SR configuration information is further used to notify the first cell that the UE is handed over from the second cell to the first cell. Further, the UE may not support uplink CA. Therefore, when the UE performs data transmission at the second base station, to stay in uplink synchronization with the first base station, an uplink synchronization interval is needed. The uplink synchronization interval is used to instruct to hand over the UE to the first cell during the interval, to send the uplink signal. Therefore, the instruction information may further include: uplink synchronization interval configuration information.

It should be noted that, the uplink synchronization interval configuration information in the instruction information may be determined by the first base station, and carried in the third handover message and sent to the second base station, to notify the second base station when the UE can receive downlink data of the second cell and when the UE cannot receive the downlink data sent by the second cell. The uplink synchronization interval configuration information may alternatively be determined by the second base station, and carried in the handover response message and sent to the first base station. It should be noted that, the uplink synchronization interval configuration information may alternatively not be included in the instruction information. Instead, the UE is handed over to the first cell in a time period of a resource indicated by the sounding reference signal configuration information, to send a sounding reference signal, and the second base station does not schedule downlink data of the UE in the time period of the resource. In this case, to notify the second base station when the UE can receive the downlink data of the second cell and when the UE cannot receive the downlink data sent by the second cell, the first base station may add the sounding reference signal configuration information to the third handover message and send the third handover message to the second base station.

After receiving the uplink signal sent by the UE, the first base station obtains the TA or TA offset of the UE according to the uplink signal.

Step 504. The first base station sends the TA or TA offset to the user equipment, where the TA or TA offset is used to enable the user equipment to establish and/or maintain uplink synchronization of the user equipment with the first cell.

In this embodiment, after obtaining the TA or TA offset of the UE, the first base station may directly send the TA or TA offset to the UE by using the first cell, or may first send the TA or TA offset to the second base station, and the second base station then forwards the TA or TA offset to the UE. A specific sending manner of the TA or TA offset is not particularly limited in the present invention.

Step 505. When the user equipment is handed over from the second cell to the first cell that is in uplink synchronization with the user equipment, the first base station performs communication with the user equipment based on the first cell.

In this embodiment, if a radio link between the UE and the second cell fails, or after the UE receives the second handover message that is sent by the second base station and that is used to instruct to hand over the UE from the second cell controlled by the second base station to the first cell controlled by the first base station, the UE needs to return to the first cell to perform data transmission. In this case, the UE can be quickly handed over, according to uplink synchronization of the UE with the first cell, from the second cell controlled by the second base station to the first cell controlled by the first base station without needing to initiate a random access process to the first cell. After the UE is handed over from the second cell to the first cell, the UE sends an SR message to the first base station on the first cell, to request the first base station to perform data scheduling on the UE, thereby performing data communication.

According to the communication method provided in this embodiment of the present invention, a first handover message is sent to UE, so that the UE is handed over from a first cell controlled by a first base station to a second cell controlled by a second base station; and communication is performed with the UE based on the first cell when the UE is handed over from the second cell to the first cell that is in uplink synchronization with the user equipment. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved. In addition, because after finding the second cell that meets a trigger condition, the UE is handed over from the first cell to the second cell to perform data communication, power consumption of the UE is reduced, and interference to other UEs is reduced. When a radio link between the UE and the second cell fails, or after the UE receives a second handover message that is sent by the second base station and that is used to instruct to hand over the UE from the second cell controlled by the second base station to the first cell controlled by the first base station, the UE can be handed over, without needing to initiate a random access process, to the first cell to perform communication, so as to reduce a data interruption time, and improve user experience.

Optionally, after the user equipment is handed over from the first cell to the second cell, the first base station saves context information of the user equipment.

Specifically, if the UE finds the second cell that meets the measurement trigger condition, and after the UE is handed over from the first cell to the second cell, the first base station maintains context information of the UE, for example, a C-RNTI of the UE, so that the UE may access the first base station at any time to perform data transmission.

Figure 6:
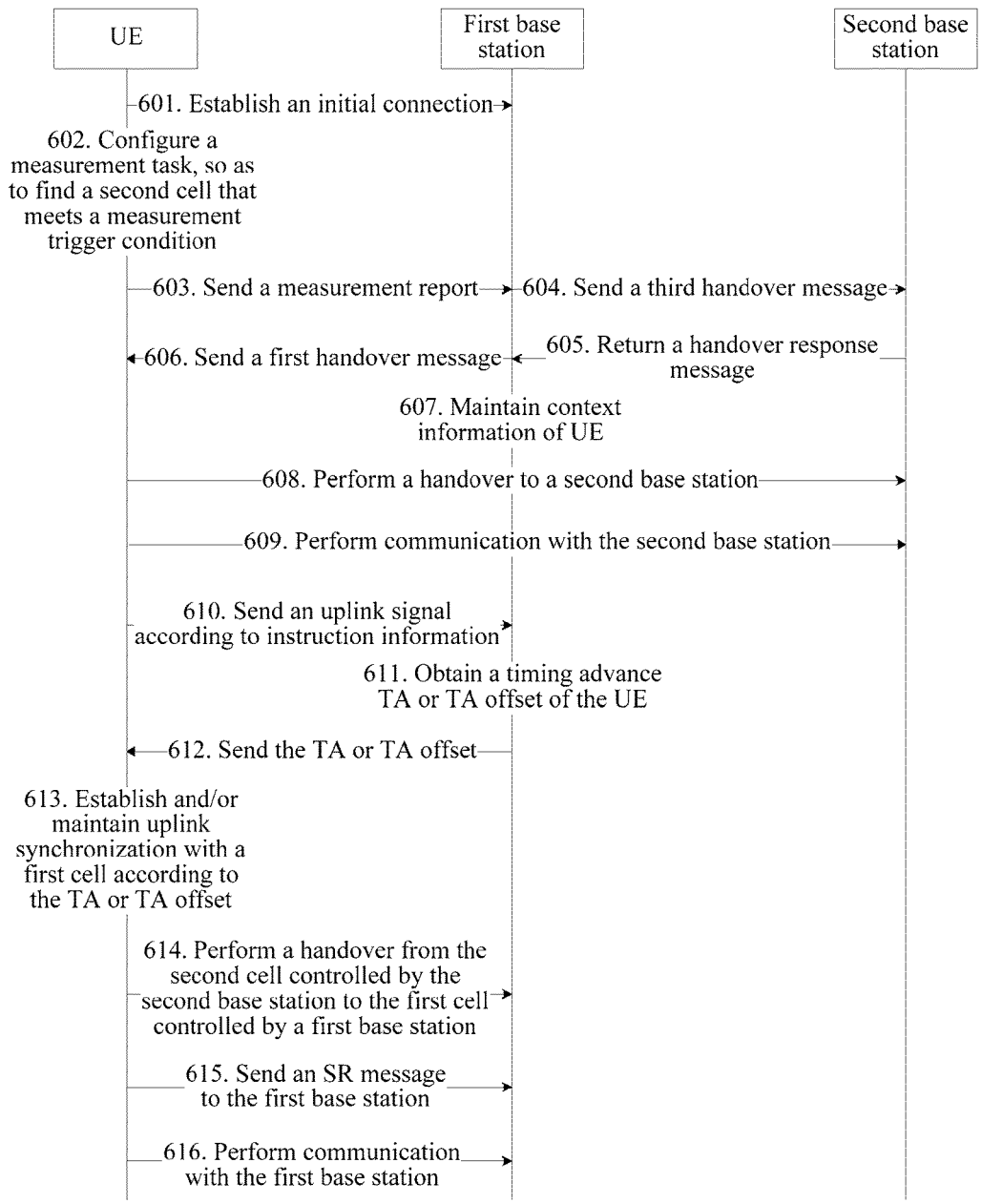
FIG. 6 is a schematic signaling diagram of Embodiment 6 of a communication method according to the present invention.

FIG. 6 is a schematic signaling diagram of Embodiment 6 of a communication method according to the present invention. An example in which UE establishes an initial connection with a first cell controlled by a first base station is used in this embodiment to describe the technical solution of the present invention. As shown in FIG. 6, the method in this embodiment may include the following steps.

Step 601. The UE establishes an initial connection with the first cell controlled by the first base station.

Step 602. Configure a measurement task for the UE, so as to find a second cell that meets a measurement trigger condition.

Step 603. The UE sends a measurement report to the first base station.

Step 604. The first base station sends a third handover message to a second base station, to request the second base station to allow the UE to establish and/or maintain uplink synchronization with the first cell after the UE is handed over from the first cell to the second cell.

Step 605. The first base station receives a handover response message that is returned by the second base station according to the third handover message.

Step 606. The first base station sends a first handover message to the UE, so that the UE is handed over from the first cell controlled by the first base station to the second cell controlled by the second base station.

Step 607. The first base station maintains context information of the UE.

Step 608. Hand over the UE to the second base station.

Step 609. The UE performs communication with the second base station.

Step 610. The first base station receives, by using the first cell, an uplink signal that is sent by the UE according to instruction information.

Step 611. The first base station obtains a timing advance TA or TA offset of the UE according to the uplink signal.

Step 612. The first base station sends the TA or TA offset to the UE.

Step 613. The UE establishes and/or maintains uplink synchronization of the UE with the first cell according to the TA or TA offset.

Step 614. The UE is handed over from the second cell controlled by the second base station to the first cell controlled by the first base station.

Step 615. The UE sends an SR message to the first base station on the first cell.

Step 616. The UE performs communication with the first base station.

According to the communication method provided in this embodiment of the present invention, a first handover message is sent to UE, so that the UE is handed over from a first cell controlled by a first base station to a second cell controlled by a second base station; and communication is performed with the UE based on the first cell when the UE is handed over from the second cell to the first cell that is in uplink synchronization with the user equipment. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved.

Figure 7:
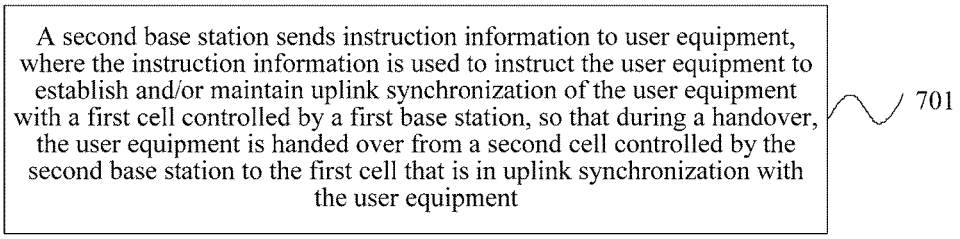
FIG. 7 is a schematic flowchart of Embodiment 7 of a communication method according to the present invention.

FIG. 7 is a schematic flowchart of Embodiment 7 of a communication method according to the present invention. This embodiment of the present invention provides a communication method. The method may be performed by any apparatus for performing the communication method, and the apparatus may be implemented by using software and/or hardware. In this embodiment, the apparatus may be integrated into a base station. As shown in FIG. 7, the method in this embodiment may include the following step.

Step 701. A second base station sends instruction information to user equipment, where the instruction information is used to instruct the user equipment to establish and/or maintain uplink synchronization of the user equipment with a first cell controlled by a first base station, so that during a handover, the user equipment is handed over from a second cell controlled by the second base station to the first cell that is in uplink synchronization with the user equipment.

In this embodiment, if when the UE establishes an initial connection with the second cell controlled by the second base station, the second base station sends the instruction information to the UE, after receiving the instruction information, the UE establishes and/or maintains, according to the instruction information, uplink synchronization of the UE with the first cell controlled by the first base station, so that when the UE needs to be handed over from the second cell to the first cell, the UE can be directly handed over, without needing to initiate a random access process, from the second cell to the first cell according to uplink synchronization of the UE with the second cell to perform data transmission. It should be noted that, when the UE is in uplink synchronization with the first cell according to the instruction information, the UE is in an RRC connected state, and in this case, a serving cell of the UE is the second cell controlled by the second base station.

According to the communication method provided in this embodiment of the present invention, instruction information is sent to UE, where the instruction information is used to instruct the UE to establish and/or maintain uplink synchronization of the UE with a first cell controlled by a first base station, so that during a handover, the user equipment is handed over from a second cell controlled by a second base station to the first cell that is in uplink synchronization with the user equipment. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved.

Optionally, based on the foregoing embodiments, the second base station sends a handover request to the first base station. The handover request is used to hand over the user equipment from the second cell to the first cell that is in uplink synchronization with the user equipment, and the user equipment performs communication based on the first cell.

Specifically, when the UE establishes the initial connection with the second cell controlled by the second base station, the second base station may further send the handover request to the first base station, to instruct the first base station to hand over the UE from the second cell to the first cell that is in uplink synchronization with the UE, so that the UE performs communication based on the first cell. It should be noted that, this step may be performed before step 701 or may be performed after step 702. This is not limited in this embodiment.

Optionally, based on the foregoing embodiments, the second base station receives an instruction response message that is returned by the user equipment according to an instruction message. The instruction response message is used to indicate that the user equipment has received the instruction information.

Specifically, after receiving the instruction information sent by the second base station, the UE returns the instruction response message to the second base station, to notify the second base station that the UE has received the instruction information sent by the second base station.

Figure 8:
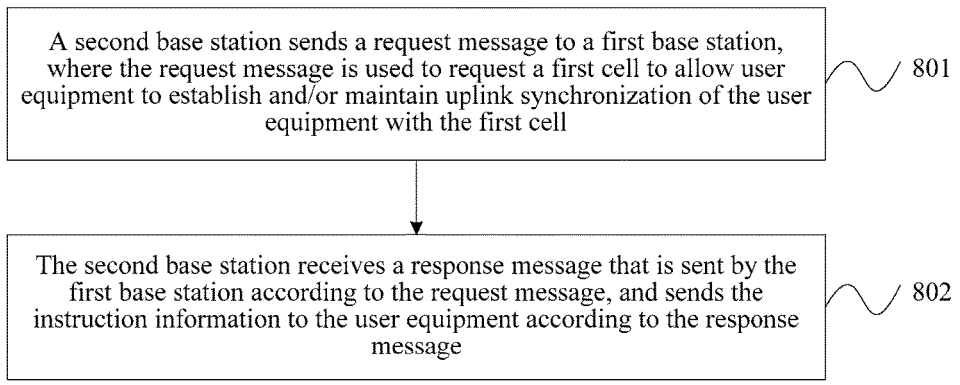
FIG. 8 is a schematic flowchart of Embodiment 8 of a communication method according to the present invention.

FIG. 8 is a schematic flowchart of Embodiment 8 of a communication method according to the present invention. Based on the embodiment shown in FIG. 7, an embodiment in which the UE establishes the initial connection with the second cell controlled by the second base station is described in detail in this embodiment. As shown in FIG. 8, the method in this embodiment may include the following steps.

Step 801. The second base station sends a request message to the first base station, where the request message is used to request the first cell to allow the user equipment to establish and/or maintain uplink synchronization of the user equipment with the first cell.

In this embodiment, the UE establishes the initial connection with the second cell controlled by the second base station, that is, the second cell is a current serving cell of the UE, and the first cell controlled by the first base station is not the serving cell of the UE. Because the second base station has a relatively small coverage area, after entering a coverage area of a small-cell base station, the UE may quickly move out of the coverage area of the small-cell base station. In this case, the UE is frequently handed over between cells, a data interruption time is increased, and a handover failure probability is increased. To resolve the problem, in this embodiment, when the UE sends data on the second cell controlled by the second base station, the second base station sends a request message to the first base station, to request the first base station to allow the UE to establish and/or maintain uplink synchronization with the first cell controlled by the first base station. Optionally, the request message carries context information of the UE, to identify the UE. For example, the context information may be a C-RNTI.

Step 802. The second base station receives a response message that is sent by the first base station according to the request message, and sends the instruction information to the user equipment according to the response message.

In this embodiment, the first base station returns the response message to the second base station according to the received request message, and after receiving the response message, the second base station sends the instruction information to the UE. Therefore, the instruction information may include one or more of the following information: sounding reference signal configuration information, random access preamble information, SR configuration information, uplink synchronization interval configuration information, or a cell radio network temporary identifier C-RNTI that is of the UE in the first cell and that is allocated by the first base station. The sounding reference signal configuration information is used to enable the UE to learn resources on which the UE sends a sounding reference signal to the first cell to establish and/or maintain uplink synchronization. The random access preamble information is used to enable the UE to learn which random access preamble resource the UE needs to use when an RACH is initiated, that is, the first base station allocates and keeps a dedicated random access preamble resource for the UE. The C-RNTI that is of the UE in the first cell and that is allocated by the first base station is used to enable the UE to access the first cell. In addition, to hand over the UE to the first cell at any time to perform data transmission, the instruction information may further include the SR configuration information. The SR configuration information is used to instruct, after the UE is handed over from the second cell to the first cell, the UE to use an SR resource indicated by the SR configuration information to send an SR to the first cell to request data scheduling. In addition, the SR configuration information is further used to notify the first cell that the UE is handed over from the second cell to the first cell. Further, the UE may not support uplink CA. Therefore, when the UE performs data transmission at the second base station, to stay in uplink synchronization with the first base station, an uplink synchronization interval is needed. The uplink synchronization interval is used to instruct to hand over the UE to the first cell during the interval, to send the uplink signal. Therefore, the instruction information may further include: uplink synchronization interval configuration information.

It should be noted that, the uplink synchronization interval configuration information in the instruction information may be determined by the first base station, and carried in the third handover message and sent to the second base station, to notify the second base station when the UE can receive downlink data of the second cell and when the UE cannot receive the downlink data sent by the second cell. The uplink synchronization interval configuration information may alternatively be determined by the second base station, and carried in the handover response message and sent to the first base station. It should be noted that, the uplink synchronization interval configuration information may alternatively not be included in the instruction information. Instead, the UE is handed over to the first cell in a time period of a resource indicated by the sounding reference signal configuration information, to send a sounding reference signal, and the second base station does not schedule downlink data of the UE in the time period of the resource. In this case, to notify the second base station when the UE can receive the downlink data of the second cell and when the UE cannot receive the downlink data sent by the second cell, the first base station may add the sounding reference signal configuration information to the third handover message and send the third handover message to the second base station.

According to the communication method provided in this embodiment of the present invention, instruction information is sent to UE, where the instruction information is used to instruct the UE to establish and/or maintain uplink synchronization of the UE with a first cell controlled by a first base station, so that the UE is handed over from a second cell controlled by a second base station to the first cell, and communication is performed with the UE when the UE is handed over, according to uplink synchronization of the UE with the first cell, from the second cell to the first cell that is in uplink synchronization with the user equipment. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved.

Optionally, the second base station sends a handover message to the UE. The handover message is used to hand over the UE from the second cell to the first cell that stays in uplink synchronization with the UE.

Specifically, the second base station may send the handover message to the UE, to instruct to hand over the UE from the second cell controlled by the second base station to the first cell controlled by the first base station. In this case, the UE can be quickly handed over, according to uplink synchronization of the UE with the first cell, from the second cell controlled by the second base station to the first cell controlled by the first base station without needing to initiate a random access process to the first cell.

Figure 9:
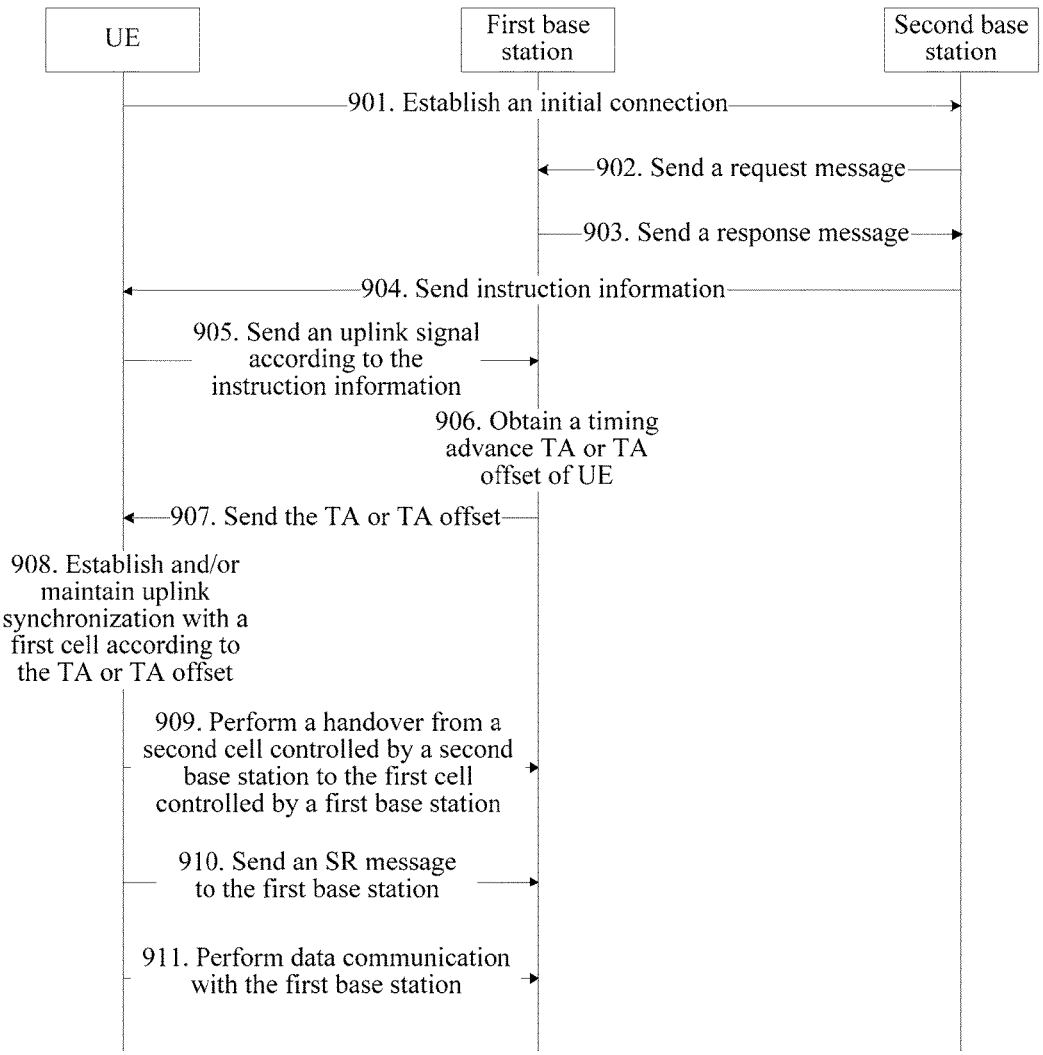
FIG. 9 is a schematic signaling diagram of Embodiment 9 of a communication method according to the present invention.

FIG. 9 is a schematic signaling diagram of Embodiment 9 of a communication method according to the present invention. An example in which UE establishes an initial connection to a second cell controlled by a second base station is used in this embodiment to describe the technical solution of the present invention in detail. As shown in FIG. 9, the method in this embodiment may include the following steps.

Step 901. The UE establishes an initial connection with the second cell controlled by the second base station.

Step 902. The second base station sends a request message to a first base station, to request a first cell to allow the UE to establish and/or maintain uplink synchronization with the first cell.

Step 903. The first base station sends a response message to the second base station.

Step 904. The second base station sends instruction information to the UE according to the response message.

Step 905. The first base station receives, by using the first cell, an uplink signal that is sent by the UE according to the instruction information.

Step 906. The first base station obtains a timing advance TA or TA offset of the UE according to the uplink signal.

Step 907. The first base station sends the TA or TA offset to the UE.

Step 908. The UE establishes and/or maintains uplink synchronization with the first cell according to the TA or TA offset.

Step 909. Hand over the UE from the second cell controlled by the second base station to the first cell controlled by the first base station.

Step 910. The UE sends an SR message to the first base station on the first cell.

Step 911. The UE performs data communication with the first base station.

According to the communication method provided in this embodiment of the present invention, instruction information is sent to UE, where the instruction information is used to instruct the UE to establish and/or maintain uplink synchronization of the UE with a first cell controlled by a first base station, so that the UE is handed over from a second cell controlled by a second base station to the first cell. Because when performing data transmission by using the second cell, the UE establishes and/or maintains uplink synchronization with the first cell, the UE can be quickly handed over, without needing to perform a random access process, to the first cell to perform communication, so that a time of data transmission interruption caused by a handover of UE between cells is reduced, and user experience is improved.

Figure 10:
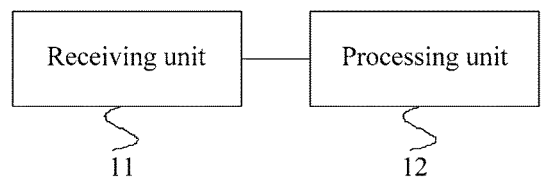
FIG. 10 is a schematic structural diagram of Embodiment 1 of user equipment according to the present invention.

FIG. 10 is a schematic structural diagram of Embodiment 1 of user equipment according to the present invention. As shown in FIG. 10, the user equipment provided in this embodiment of the present invention includes a receiving unit 11 and a processing unit 12.

The receiving unit 11 is configured to receive instruction information, where the instruction information is used to instruct the user equipment to establish and/or maintain uplink synchronization of the user equipment with a first cell controlled by a first base station. The processing unit 12 is configured to perform a handover from the second cell to the first cell that is in uplink synchronization with the user equipment, and perform communication based on the first cell.

When the user equipment is in uplink synchronization with the first cell according to the instruction information, the user equipment is in a radio resource control RRC connected state, and a serving cell of the user equipment is a second cell controlled by a second base station.

The user equipment provided in this embodiment of the present invention receives instruction information. When the UE is in uplink synchronization with a first cell according to the instruction information, the UE is in a radio resource control RRC connected state, and a serving cell of the UE is a second cell controlled by a second base station. The UE is handed over from the second cell to the first cell that is in uplink synchronization with the UE, and performs communication based on the first cell. Because when performing data transmission based on the second cell, the UE establishes and/or maintains uplink synchronization with the first cell, when the UE needs to perform communication based on the first cell, the UE can be quickly handed over to the first cell without needing to perform a random access process, so that a time of data transmission interruption caused by a handover of UE between cells is reduced, and user experience is improved.

Optionally, the receiving unit 11 is specifically configured to:

receive a first handover message sent by the first base station, where the first handover message is used to instruct to hand over the user equipment from the first cell to the second cell, and the first handover message includes the instruction information.

Optionally, the receiving unit 11 is specifically configured to:

receive the instruction information sent by the second base station.

Figure 11:
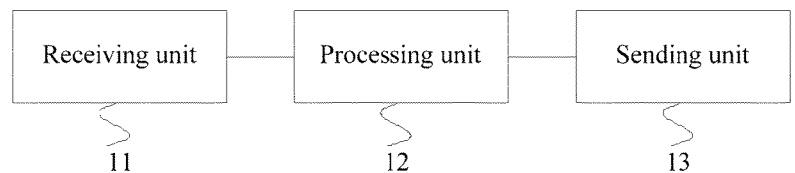
FIG. 11 is a schematic structural diagram of Embodiment 2 of user equipment according to the present invention.

FIG. 11 is a schematic structural diagram of Embodiment 2 of user equipment according to the present invention. As shown in FIG. 11, this embodiment is based on the embodiment shown in FIG. 10, and the user equipment further includes a sending unit 13.

The sending unit 13 is configured to send an uplink signal to the first base station according to the instruction information, so that the first base station obtains a timing advance TA or TA offset of the user equipment according to the uplink signal.

The receiving unit 11 is further configured to receive the TA or TA offset sent by the first base station or sent by the first base station by using the second base station.

The processing unit 12 is configured to establish and/or maintain uplink synchronization of the user equipment with the first cell according to the TA or TA offset.

Optionally, the uplink signal sent by the sending unit 13 includes: a random access preamble signal, or a sounding reference signal, or a scheduling request SR signal.

Optionally, the instruction information received by the receiving unit 11 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the receiving unit 11 is further configured to receive a second handover message sent by the second base station.

The processing unit 12 is specifically configured to:

if a radio link between the user equipment and the second cell fails, or the receiving unit 11 receives the second handover message sent by the second base station, perform a handover from the second cell to the first cell that stays in uplink synchronization with the user equipment, where the second handover message is used to instruct to hand over the user equipment from the second cell to the first cell.

Optionally, the sending unit 13 is further configured to send an SR message to the first base station by using the first cell, where the SR message is used to request the first base station to perform data scheduling on the user equipment.

The user equipment in this embodiment may be configured to execute the technical solution in the communication method provided in any embodiment of the present invention. The implementation principles and technical effects are similar, and are not described herein again.

Figure 12:
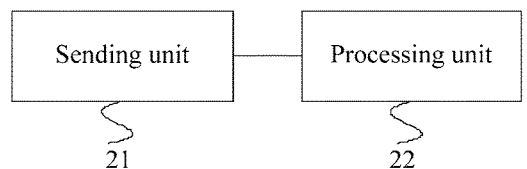
FIG. 12 is a schematic structural diagram of Embodiment 1 of a base station according to the present invention.

FIG. 12 is a schematic structural diagram of Embodiment 1 of a base station according to the present invention. As shown in FIG. 12, the base station provided in this embodiment of the present invention includes a sending unit 21 and a processing unit 22.

The sending unit 21 is configured to send a first handover message to user equipment, where the first handover message is used to instruct to hand over the user equipment from a first cell controlled by a first base station to a second cell controlled by a second base station, the first handover message includes the instruction information, and the instruction information is used to instruct the user equipment to establish and/or maintain uplink synchronization of the user equipment with the first cell. The processing unit 22 is configured to: when the user equipment is handed over from the second cell to the first cell that is in uplink synchronization with the user equipment, perform communication with the user equipment based on the first cell.

The base station provided in this embodiment of the present invention sends a first handover message to UE, so that the UE is handed over from a first cell controlled by a first base station to a second cell controlled by a second base station; and communication is performed with the UE based on the first cell when the UE is handed over from the second cell to the first cell that is in uplink synchronization with the user equipment. Because when performing data transmission by using the second cell, the UE establishes and/or maintains uplink synchronization with the first cell, so that the UE can be handed over, without needing to perform a random access process, to the first cell to perform communication, so that a time of data transmission interruption caused by a handover of UE between cells is reduced, and user experience is improved.

Figure 13:
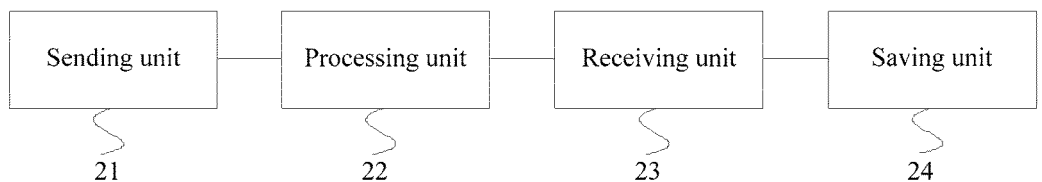
FIG. 13 is a schematic structural diagram of Embodiment 2 of a base station according to the present invention.

FIG. 13 is a schematic structural diagram of Embodiment 2 of a base station according to the present invention. As shown in FIG. 13, this embodiment is based on the embodiment shown in FIG. 12, and the base station includes a receiving unit 23.

The receiving unit 23 is configured to receive, based on the first cell, an uplink signal that is sent by the user equipment according to the instruction information, and obtain a timing advance TA or TA offset of the user equipment according to the uplink signal. The sending unit 21 is further configured to send the TA or TA offset to the user equipment, where the TA or TA offset is used to enable the user equipment to establish and/or maintain uplink synchronization of the user equipment with the first cell.

Optionally, the uplink signal received by the receiving unit 23 includes: a random access preamble signal, or a sounding reference signal, or a scheduling request SR signal.

Optionally, the base station further includes: a saving unit 24.

The saving unit 24 is configured to save context information of the user equipment after the user equipment is handed over from the first cell to the second cell.

Optionally, the instruction information sent by the sending unit 21 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the sending unit 21 is further configured to send a third handover message to the second base station, where the third handover message is used to request the second base station to allow the user equipment to establish and/or maintain uplink synchronization with the first cell after the user equipment is handed over from the first cell to the second cell.

The receiving unit 23 is further configured to receive a handover response message that is returned by the second base station according to the third handover message.

Optionally, the third handover message sent by the sending unit 21 includes at least one of the following information: sounding reference signal configuration information, scheduling request SR configuration information, or uplink synchronization interval configuration information.

The base station in this embodiment may be configured to execute the technical solution in the communication method provided in any embodiment of the present invention. The implementation principles and technical effects are similar, and are not described herein again.

Figure 14:
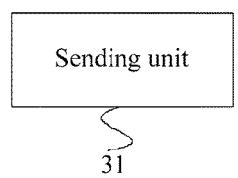
FIG. 14 is a schematic structural diagram of Embodiment 3 of a base station according to the present invention.

FIG. 14 is a schematic structural diagram of Embodiment 3 of a base station according to the present invention. As shown in FIG. 14, the base station provided in this embodiment of the present invention includes a sending unit 31.

The sending unit 31 is configured to send instruction information to user equipment, where the instruction information is used to instruct the user equipment to establish and/or maintain uplink synchronization of the user equipment with a first cell controlled by a first base station, so that during a handover, the user equipment is handed over from a second cell controlled by a second base station to the first cell that is in uplink synchronization with the user equipment.

Optionally, the instruction information sent by the sending unit 31 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the sending unit 31 is further configured to send a handover message to the user equipment, where the handover message is used to hand over the user equipment from the second cell to the first cell that stays in uplink synchronization with the user equipment.

Figure 15:
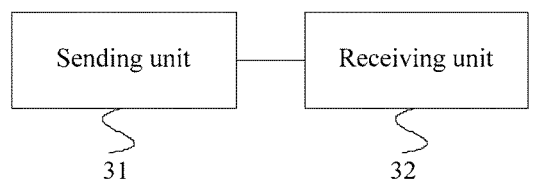
FIG. 15 is a schematic structural diagram of Embodiment 4 of a base station according to the present invention.

FIG. 15 is a schematic structural diagram of Embodiment 4 of a base station according to the present invention. As shown in FIG. 15, this embodiment is based on the embodiment shown in FIG. 14, and the base station includes a receiving unit 32.

The sending unit 31 is further configured to send a request message to the first base station, where the request message is used to request the first cell to allow the user equipment to establish and/or maintain uplink synchronization with the first cell.

The receiving unit 32 is further configured to receive a response message that is sent by the first base station according to the request message.

The base station in this embodiment may be configured to execute the technical solution in the communication method provided in any embodiment of the present invention. The implementation principles and technical effects are similar, and are not described herein again.

Figure 16:
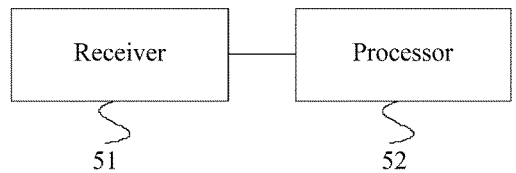
FIG. 16 is a schematic structural diagram of Embodiment 1 of user equipment according to the present invention.

FIG. 16 is a schematic structural diagram of Embodiment 1 of user equipment according to the present invention. As shown in FIG. 16, the user equipment provided in this embodiment of the present invention includes a receiver 51 and a processor 52.

The receiver 51 is configured to receive instruction information, where the instruction information is used to instruct the user equipment to establish and/or maintain uplink synchronization of the user equipment with a first cell controlled by a first base station. The processor 52 is configured to perform a handover from a second cell to the first cell that is in uplink synchronization with the user equipment, and perform communication based on the first cell.

When the user equipment is in uplink synchronization with the first cell according to the instruction information, the user equipment is in a radio resource control RRC connected state, and a serving cell of the user equipment is a second cell controlled by a second base station.

The user equipment provided in this embodiment may be configured to execute the technical solution in the communication method provided in any embodiment of the present invention. The implementation principles and technical effects are similar, and are not described herein again.

Optionally, the receiver 51 is specifically configured to: receive a first handover message sent by the first base station, where the first handover message is used to instruct to hand over the user equipment from the first cell to the second cell, and the first handover message includes the instruction information.

Optionally, the receiver 51 is specifically configured to: receive the instruction information sent by the second base station.

The user equipment provided in this embodiment may be configured to execute the technical solution in the communication method provided in any embodiment of the present invention. The implementation principles and technical effects are similar, and are not described herein again.

Figure 17:
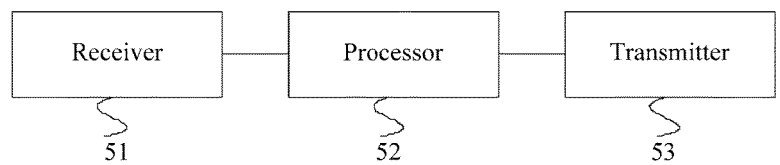
FIG. 17 is a schematic structural diagram of Embodiment 2 of user equipment according to the present invention.

FIG. 17 is a schematic structural diagram of Embodiment 2 of user equipment according to the present invention. As shown in FIG. 17, this embodiment is based on the embodiment shown in FIG. 16, and the user equipment includes a transmitter 53.

The transmitter 53 is configured to send an uplink signal to the first base station according to the instruction information, so that the first base station obtains a timing advance TA or TA offset of the user equipment according to the uplink signal.

The receiver 51 is further configured to receive the TA or TA offset sent by the first base station or sent by the first base station by using the second base station.

The processor 52 is further configured to establish and/or maintain uplink synchronization of the user equipment with the first cell according to the TA or TA offset.

Optionally, the uplink signal sent by the transmitter 53 includes: a random access preamble signal, or a sounding reference signal, or a scheduling request SR signal.

Optionally, the instruction information received by the receiver 51 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the receiver 51 is further configured to receive a second handover message sent by the second base station.

The processor 52 is further configured to: if a radio link between the user equipment and the second cell fails, or the receiver receives the second handover message sent by the second base station, perform a handover from the second cell to the first cell that stays in uplink synchronization with the user equipment, where the second handover message is used to instruct to hand over the user equipment from the second cell to the first cell.

Optionally, the transmitter 53 is further configured to send an SR message to the first base station by using the first cell, where the SR message is used to request the first base station to perform data scheduling on the user equipment.

The user equipment provided in this embodiment may be configured to execute the technical solution in the communication method provided in any embodiment of the present invention. The implementation principles and technical effects are similar, and are not described herein again.

Figure 18:
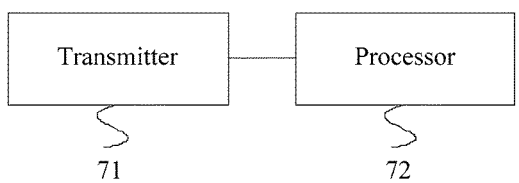
FIG. 18 is a schematic structural diagram of Embodiment 1 of a base station according to the present invention.

FIG. 18 is a schematic structural diagram of Embodiment 1 of a base station according to the present invention. As shown in FIG. 18, the base station provided in this embodiment of the present invention includes a transmitter 71 and a processor 72.

The transmitter 71 is configured to send a first handover message to user equipment, where the first handover message is used to instruct to hand over the user equipment from a first cell controlled by a first base station to a second cell controlled by a second base station, where the first handover message includes the instruction information, and the instruction information is used to instruct the user equipment to establish and/or maintain uplink synchronization of the user equipment with the first cell. The processor 72 is configured to: when the user equipment is handed over from the second cell to the first cell that is in uplink synchronization with the user equipment, perform communication with the user equipment based on the first cell.

The base station provided in this embodiment may be configured to execute the technical solution in the communication method provided in any embodiment of the present invention. The implementation principles and technical effects are similar, and are not described herein again.

Figure 19:
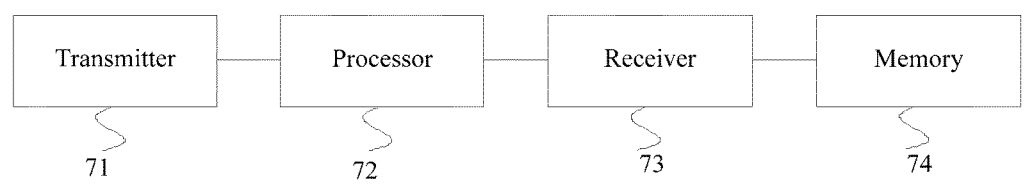
FIG. 19 is a schematic structural diagram of Embodiment 2 of a base station according to the present invention.

FIG. 19 is a schematic structural diagram of Embodiment 2 of a base station according to the present invention. As shown in FIG. 19, this embodiment is based on the embodiment shown in FIG. 18, and the base station includes a receiver 73.

The receiver 73 is configured to receive, based on the first cell, an uplink signal sent by the user equipment according to the instruction information, and obtain a timing advance TA or TA offset of the user equipment according to the uplink signal.

The transmitter 71 is further configured to send the TA or TA offset to the user equipment, where the TA or TA offset is used to enable the user equipment to establish and/or maintain uplink synchronization of the user equipment with the first cell.

Optionally, the uplink signal received by the receiver 73 includes: a random access preamble signal, or a sounding reference signal, or a scheduling request SR signal.

Optionally, the base station further includes a memory 74.

The memory 74 is configured to save context information of the user equipment after the user equipment is handed over from the first cell to the second cell.

Optionally, the instruction information sent by the transmitter 71 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the transmitter 71 is further configured to send a third handover message to the second base station, where the third handover message is used to request the second base station to allow the user equipment to establish and/or maintain uplink synchronization with the first cell after the user equipment is handed over from the first cell to the second cell.

The receiver 73 is further configured to receive a handover response message that is returned by the second base station according to the third handover message.

Optionally, the third handover message sent by the transmitter 71 includes at least one of the following information: sounding reference signal configuration information, scheduling request SR configuration information, or uplink synchronization interval configuration information.

The base station provided in this embodiment may be configured to execute the technical solution in the communication method provided in any embodiment of the present invention. The implementation principles and technical effects are similar, and are not described herein again.

Figure 20:
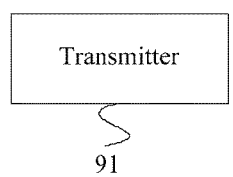
FIG. 20 is a schematic structural diagram of Embodiment 3 of a base station according to the present invention.

FIG. 20 is a schematic structural diagram of Embodiment 3 of a base station according to the present invention. As shown in FIG. 20, the base station provided in this embodiment of the present invention includes a transmitter 91.

The transmitter 91 is configured to send instruction information to user equipment, where the instruction information is used to instruct the user equipment to establish and/or maintain uplink synchronization of the user equipment with a first cell controlled by a first base station, so that during a handover, the user equipment is handed over from a second cell controlled by the second base station to the first cell that is in uplink synchronization with the user equipment.

The base station provided in this embodiment may be configured to execute the technical solution in the communication method provided in any embodiment of the present invention. The implementation principles and technical effects are similar, and are not described herein again.

Optionally, the instruction information sent by the transmitter 91 includes at least one of the following information: sounding reference signal configuration information, random access preamble information, SR configuration information, uplink synchronization interval configuration information, or a cell radio network temporary identifier C-RNTI that is of the user equipment in the first cell and that is allocated by the first base station.

Optionally, the transmitter 91 is further configured to send a handover message to the user equipment, where the handover message is used to hand over the user equipment from the second cell to the first cell that stays in uplink synchronization with the user equipment.

Figure 21:
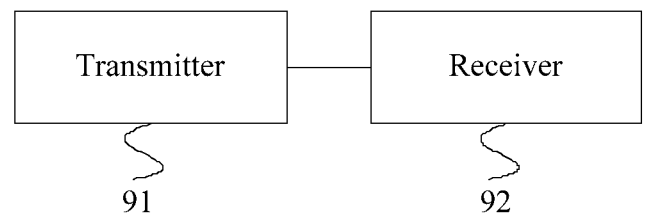
FIG. 21 is a schematic structural diagram of Embodiment 4 of a base station according to the present invention.

FIG. 21 is a schematic structural diagram of Embodiment 4 of a base station according to the present invention. As shown in FIG. 21, this embodiment is based on the embodiment shown in FIG. 20, and the base station further includes a receiver 92.

The transmitter 91 is further configured to send a request message to the first base station, where the request message is used to request the first cell to allow the user equipment to establish and/or maintain uplink synchronization with the first cell.

The receiver 92 is further configured to receive a response message that is sent by the first base station according to the request message.

The base station in this embodiment may be configured to execute the technical solution in the communication method provided in any embodiment of the present invention. The implementation principles and technical effects are similar, and are not described herein again.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still enable modifications to the technical solutions described in the foregoing embodiments or enable equivalent replacements to some technical features thereof, without departing from the spirit and scope of the technical solutions of the embodiments of this application.

What is claimed is:

1. A communication method comprising:
   receiving, by user equipment, a first handover message from a first base station which instructs the user equipment to hand over from a first cell controlled by the first base station to a second cell controlled by a second base station, wherein the first handover message further comprises instruction information, which instructs the user equipment to be in a radio resource control (RRC) connected state and implement at least one of the following after the user equipment is handed over from the first cell to the second cell: (a) establishing uplink synchronization of the user equipment with the first cell, and (b) maintaining the uplink synchronization with the first cell; and
   when the user equipment is handed back to the first cell from the second cell due to the uplink synchronization that the user equipment has established/maintained with the first cell, performing communication directly with the first base station based on the first cell without a random access process.

2. The method according to claim 1, wherein the receiving the instruction information comprises:
   receiving, by the user equipment, the instruction information sent by the second base station.

3. The method according to claim 1, further comprising:
   sending, by the user equipment, an uplink signal to the first base station according to the instruction information, so that the first base station obtains a timing advance (TA) or TA offset of the user equipment according to the uplink signal; and
   receiving, by the user equipment, the TA or TA offset sent by the first base station or sent by the first base station by using the second base station, and implementing at least one of the following: (a) establishing the uplink synchronization of the user equipment with the first cell according to the TA or TA offset, and (b) maintaining the uplink synchronization according to the TA or TA offset.

4. The method according to claim 3, wherein the uplink signal comprises:
   a random access preamble signal, a sounding reference signal, or a scheduling request (SR) signal.

5. The method according to claim 1, wherein the instruction information comprises at least one of the following information:
   sounding reference signal configuration information, random access preamble information, scheduling request (SR) configuration information, uplink synchronization interval configuration information, or a cell radio network temporary identifier (C-RNTI) that is of the user equipment in the first cell and that is allocated by the first base station.

6. The method according to claim 5, wherein:
   the sounding reference signal configuration information enables the user equipment to learn resources on which the user equipment sends a sounding reference signal to the first cell to establish and/or maintain the uplink synchronization;
   the SR configuration information
      instructs the user equipment to use an SR resource indicated by the SR configuration information to send an SR to the first cell to request data scheduling after the UE is handed over from the second cell to the first cell, and
      notifies the first cell that the user equipment is handed over from the second cell to the first cell; and
   the uplink synchronization interval configuration information instructs the user equipment to be handed over to the first cell during the interval while staying in uplink synchronization with the first base station to send the uplink signal when
      the user equipment does not support uplink carrier aggregation (CA), and
      the user equipment performs data transmission at the second base station.

7. A communication method comprising:
   sending, by a first base station, a first handover message to user equipment, which instructs the user equipment to hand over from a first cell controlled by the first base station to a second cell controlled by a second base station, wherein the first handover message further comprises instruction information, which instructs the user equipment to be in a radio resource control (RRC) connected state and implement at least one of the following after the user equipment is handed over from the first cell to the second cell: (a) establishing uplink synchronization of the user equipment with the first cell, and (b) maintaining the uplink synchronization with the first cell; and
   when the user equipment is handed back over to the first cell from the second cell due to the uplink synchronization that the user equipment has established/maintained with the first cell, directly performing, by the first base station, communication with the user equipment based on the first cell without a random access process.

8. The method according to claim 7, further comprising:
   receiving, by the first base station based on the first cell, an uplink signal that is sent by the user equipment according to the instruction information, and obtaining a timing advance (TA) or TA offset of the user equipment according to the uplink signal; and sending, by the first base station, the TA or TA offset to the user equipment, wherein the TA or TA offset is used to enable the user equipment to implement at least one of the following: (a) establishing the uplink synchronization of the user equipment with the first cell, and (b) maintaining the uplink synchronization.

9. The method according to claim 8, wherein the uplink signal comprises: a random access preamble signal, a sounding reference signal, or a scheduling request (SR) signal.

10. The method according to claim 7, wherein the instruction information comprises at least one of the following information: sounding reference signal configuration information, random access preamble information, scheduling request (SR) configuration information, uplink synchronization interval configuration information, or a cell radio network temporary identifier (C-RNTI) that is of the user equipment in the first cell and that is allocated by the first base station.

11. User equipment comprising:
   a receiver, configured to receive a first handover message from a first base station which instructs the user equipment to hand over from a first cell controlled by the first base station to a second cell controlled by a second base station, wherein the first handover message further comprises instruction information, which instructs the user equipment to be in a radio resource control (RRC) connected state and implement at least one of the following after the user equipment is handed over from the first cell to the second cell: (a) establishing uplink synchronization of the user equipment with the first cell, and (b) maintaining the uplink synchronization with the first cell; and
   a processor configured to perform
      a handover from the second cell to the first cell when the user equipment is handed back over to the first cell from the second cell, and
      communication directly with the first base station based on the first cell without a random access process, due to the uplink synchronization that the user equipment has established/maintained with the first cell.

12. The user equipment according to claim 11, wherein the receiver is configured to receive the instruction information sent by the second base station.

13. The user equipment according to claim 11, wherein the user equipment further comprises: a transmitter, wherein
   the transmitter is configured to send an uplink signal to the first base station according to the instruction information, so that the first base station obtains a timing advance (TA) or TA offset of the user equipment according to the uplink signal;
   the receiver is further configured to receive the TA or TA offset sent by the first base station or sent by the first base station by using the second base station; and
   the processor is further configured to implement at least one of the following: (a) establishing the uplink synchronization of the user equipment with the first cell according to the TA or TA offset, and (b) maintaining the uplink synchronization according to the TA or TA offset.

14. The user equipment according to claim 13, wherein the uplink signal sent by the transmitter comprises a random access preamble signal, a sounding reference signal, or a scheduling request (SR) signal.

15. The user equipment according to claim 11, wherein the instruction information received by the receiver comprises at least one of the following information:
   sounding reference signal configuration information,
   random access preamble information,
   scheduling request (SR) configuration information,
   uplink synchronization interval configuration information, or
   a cell radio network temporary identifier (C-RNTI) that is of the user equipment in the first cell and that is allocated by the first base station.

16. The user equipment according to claim 15, wherein:
   the sounding reference signal configuration information enables the user equipment to learn resources on which the user equipment sends a sounding reference signal to the first cell to establish and/or maintain the uplink synchronization;
   the SR configuration information instructs, the user equipment to use an SR resource indicated by the SR configuration information to send an SR to the first cell to request data scheduling after the UE is handed over from the second cell to the first cell; and the SR configuration information further notifies the first cell that the user equipment is handed over from the second cell to the first cell; and
   when the user equipment does not support uplink carrier aggregation (CA), and when the user equipment performs data transmission at the second base station, the uplink synchronization interval configuration information instructs the user equipment to be handed over to the first cell during the interval while stay in the uplink synchronization with the first base station, to send the uplink signal.

17. A base station comprising:
   a transmitter configured to send a first handover message to user equipment, which instructs the user equipment to hand over from a first cell controlled by a first base station to a second cell controlled by a second base station, wherein the first handover message further comprises instruction information, which instructs the user equipment to be in a radio resource control (RRC) connected state and implement at least one of the following after the user equipment is handed over to the second cell from the first cell: (a) establishing uplink synchronization of the user equipment with the first cell, and (b) maintaining the uplink synchronization with the first cell; and
   a processor configured to: when the user equipment is handed over back from the second cell to the first cell, due to the uplink synchronization that the user equipment has established/maintained with the first cell, directly perform communication with the user equipment based on the first cell without a random access process.

18. The base station according to claim 17, wherein the base station further comprises: a receiver, wherein
   the receiver is configured to receive, based on the first cell, an uplink signal that is sent by the user equipment according to the instruction information, and obtain a timing advance (TA) or TA offset of the user equipment according to the uplink signal; and
   the transmitter is further configured to send the TA or TA offset to the user equipment, wherein the TA or TA offset is used to enable the user equipment to implement at least one of the following: (a) establishing the uplink synchronization of the user equipment with the first cell, and (b) maintaining the uplink synchronization.

19. The base station according to claim 18, wherein the uplink signal received by the receiver comprises a random access preamble signal, a sounding reference signal, or a scheduling request (SR) signal.

20. The base station according to claim 17, wherein the instruction information sent by the transmitter comprises at least one of the following information:
- sounding reference signal configuration information,
- random access preamble information,
- scheduling request (SR) configuration information,
- uplink synchronization interval configuration information, or
- a cell radio network temporary identifier (C-RNTI) that is of the user equipment in the first cell and that is allocated by the first base station.

* * * * *